United States Patent
Hart

(10) Patent No.: US 7,048,185 B2
(45) Date of Patent: May 23, 2006

(54) EQUIPMENT TRACKING SYSTEM AND METHOD

(75) Inventor: John E. Hart, Sammamish, WA (US)

(73) Assignee: Fleettrakker, L.L.C., Issaquah, WA (US)

( * ) Notice: Subject to any disclaimer, the term of this patent is extended or adjusted under 35 U.S.C. 154(b) by 216 days.

(21) Appl. No.: 10/472,455

(22) PCT Filed: Mar. 7, 2003

(86) PCT No.: PCT/US03/07075

§ 371 (c)(1),
(2), (4) Date: Sep. 19, 2003

(87) PCT Pub. No.: WO03/077073

PCT Pub. Date: Sep. 18, 2003

(65) Prior Publication Data

US 2004/0262387 A1 Dec. 30, 2004

Related U.S. Application Data

(60) Provisional application No. 60/362,868, filed on Mar. 8, 2002.

(51) Int. Cl.
*G07B 15/02* (2006.01)

(52) U.S. Cl. ...................... 235/384; 235/385

(58) Field of Classification Search ............... 235/385, 235/376–377, 383–384; 705/4, 7–8, 28–29; 702/127; 701/29–30
See application file for complete search history.

(56) References Cited

U.S. PATENT DOCUMENTS

| | | | |
|---|---|---|---|
| 5,680,328 A | 10/1997 | Skorupski et al. | 364/550 |
| 5,839,112 A * | 11/1998 | Schreitmueller et al. | 705/4 |
| 6,370,454 B1 | 4/2002 | Moore | 701/29 |
| 6,450,411 B1 | 9/2002 | Rash et al. | 236/44 A |
| 6,671,646 B1 | 12/2003 | Manegold et al. | 702/127 |
| 2001/0047283 A1* | 11/2001 | Melick et al. | 705/8 |
| 2002/0016655 A1 | 2/2002 | Joao | 701/35 |
| 2002/0022979 A1 | 2/2002 | Whipp et al. | 705/5 |
| 2002/0022984 A1 | 2/2002 | Daniel et al. | 705/8 |
| 2002/0065698 A1 | 5/2002 | Schick et al. | 705/8 |
| 2002/0107833 A1 | 8/2002 | Kerkinni | 707/1 |
| 2002/0107873 A1 | 8/2002 | Winkler et al. | 707/104.1 |
| 2002/0122583 A1 | 9/2002 | Thompson | 382/141 |
| 2002/0133273 A1 | 9/2002 | Lowrey et al. | 701/29 |
| 2002/0133275 A1 | 9/2002 | Thibault | 701/35 |
| 2002/0156558 A1 | 10/2002 | Hanson et al. | 701/33 |
| 2002/0163449 A1 | 11/2002 | Flick | 340/988 |
| 2002/0178147 A1 | 11/2002 | Arroyo et al. | 707/2 |
| 2002/0188593 A1 | 12/2002 | Moser et al. | 707/1 |
| 2003/0050764 A1 | 3/2003 | Manegold et al. | 702/127 |
| 2003/0061005 A1 | 3/2003 | Manegold et al. | 702/182 |

FOREIGN PATENT DOCUMENTS

| | | | |
|---|---|---|---|
| JP | 60204071 A | * | 10/1985 |
| JP | 11327628 A | * | 11/1999 |
| WO | WO 03/023550 A2 | | 7/2002 |

* cited by examiner

*Primary Examiner*—Daniel Stcyr
*Assistant Examiner*—Daniel A. Hess
(74) *Attorney, Agent, or Firm*—Dorsey & Whitney LLP

(57) ABSTRACT

A system and method for tracking and recording equipment information related to a fleet of equipment. The equipment information can be accessed and updated through the use of a data device carried by fleet personnel in the field, recording, facilitating inspection, service, maintenance, and repair of the equipment.

33 Claims, 23 Drawing Sheets

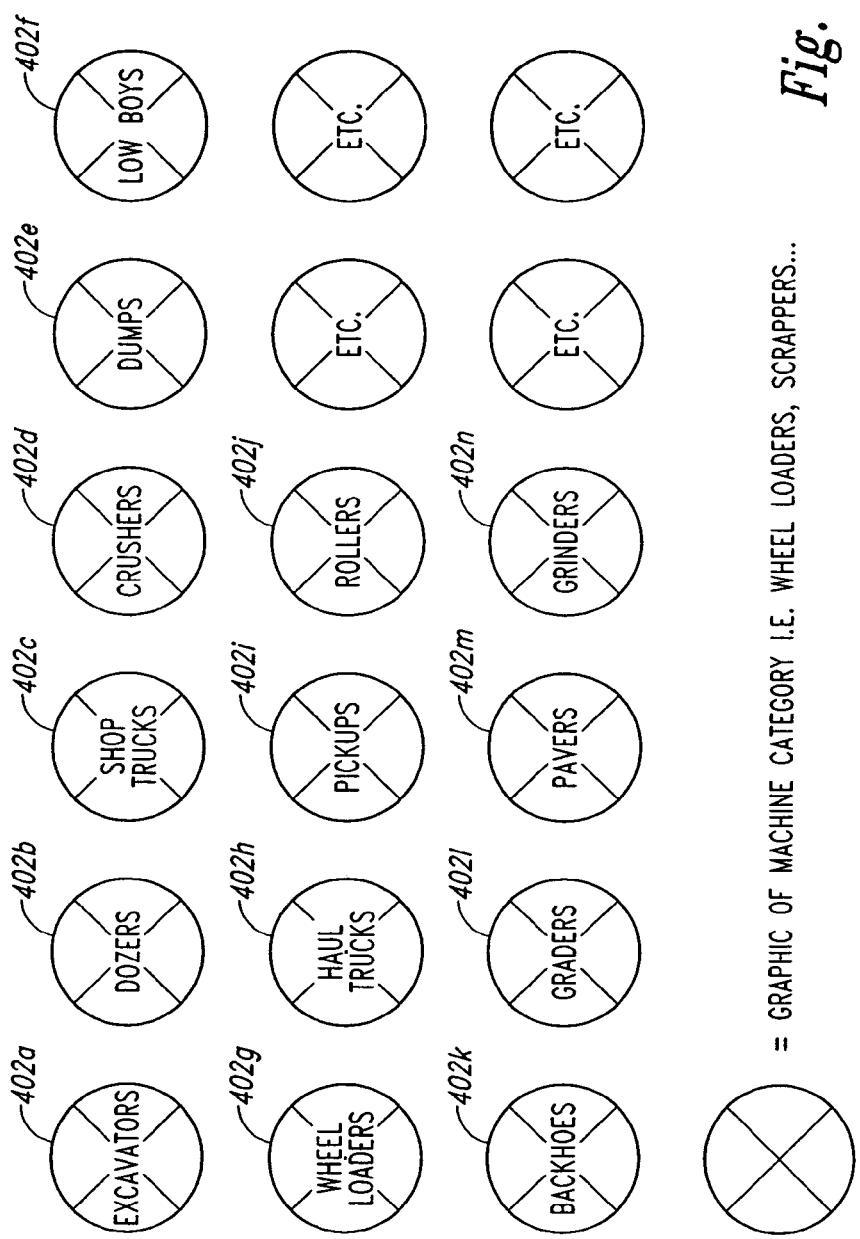

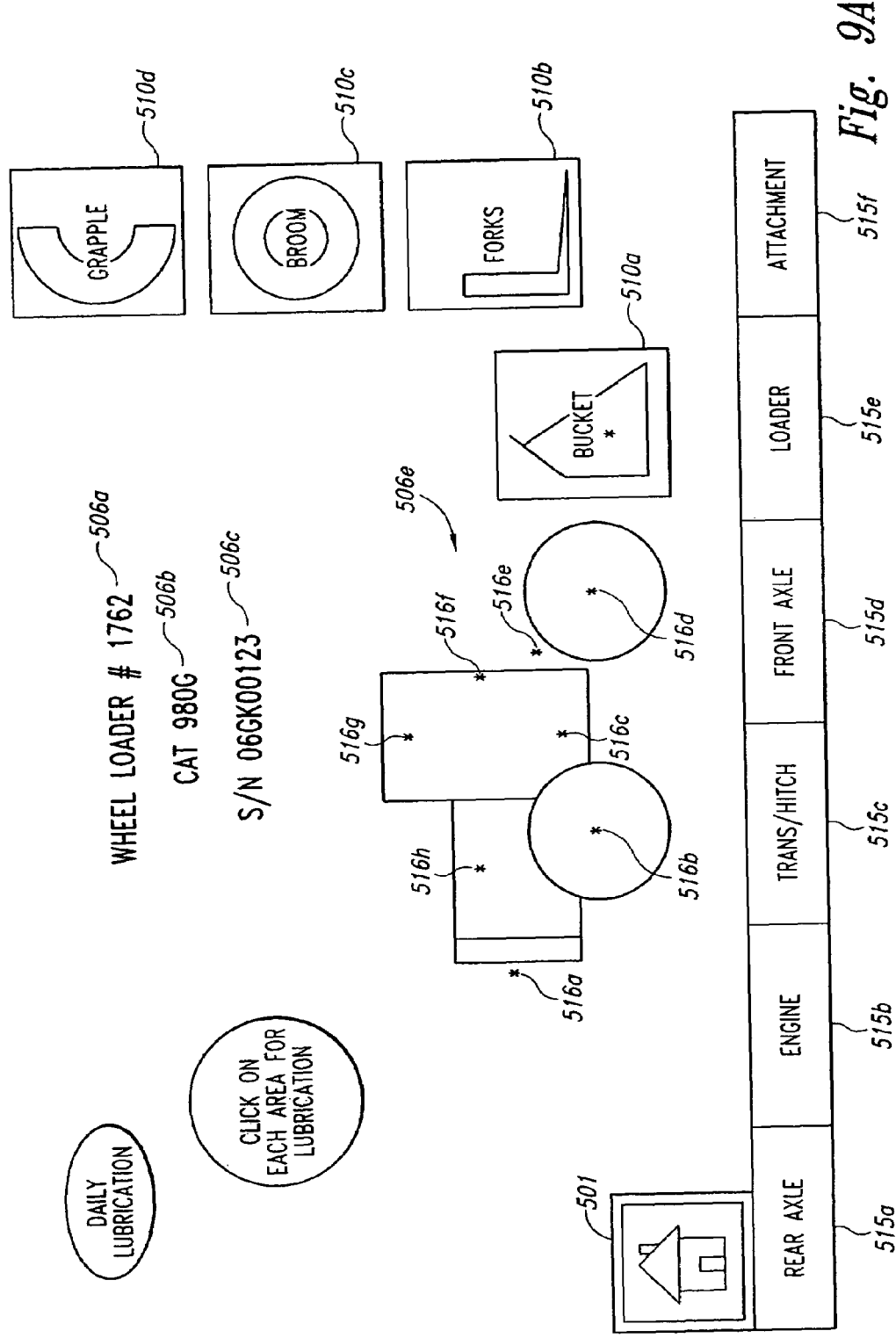

• LUBRICATION POINTS

DAILY LUBRICATION

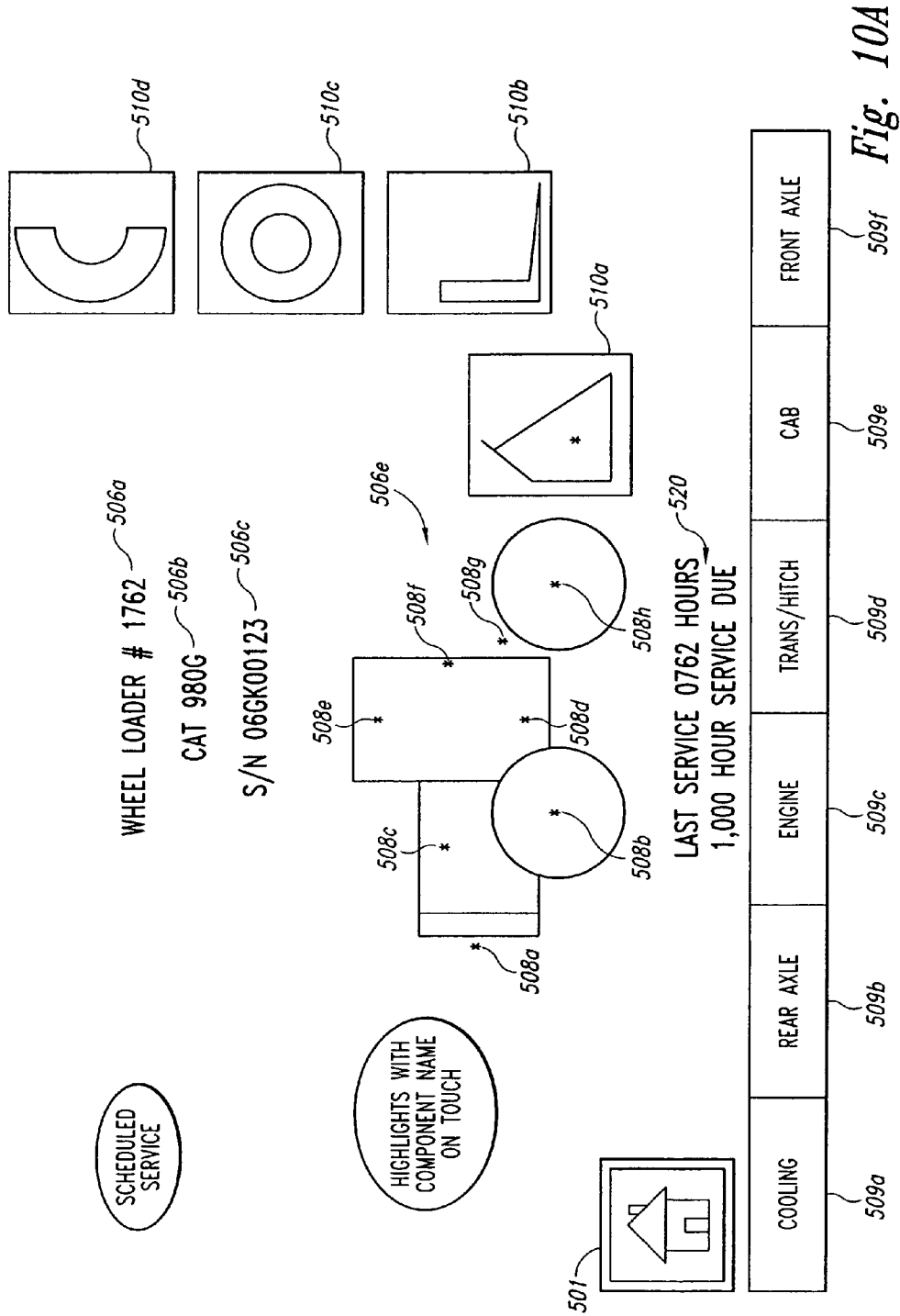

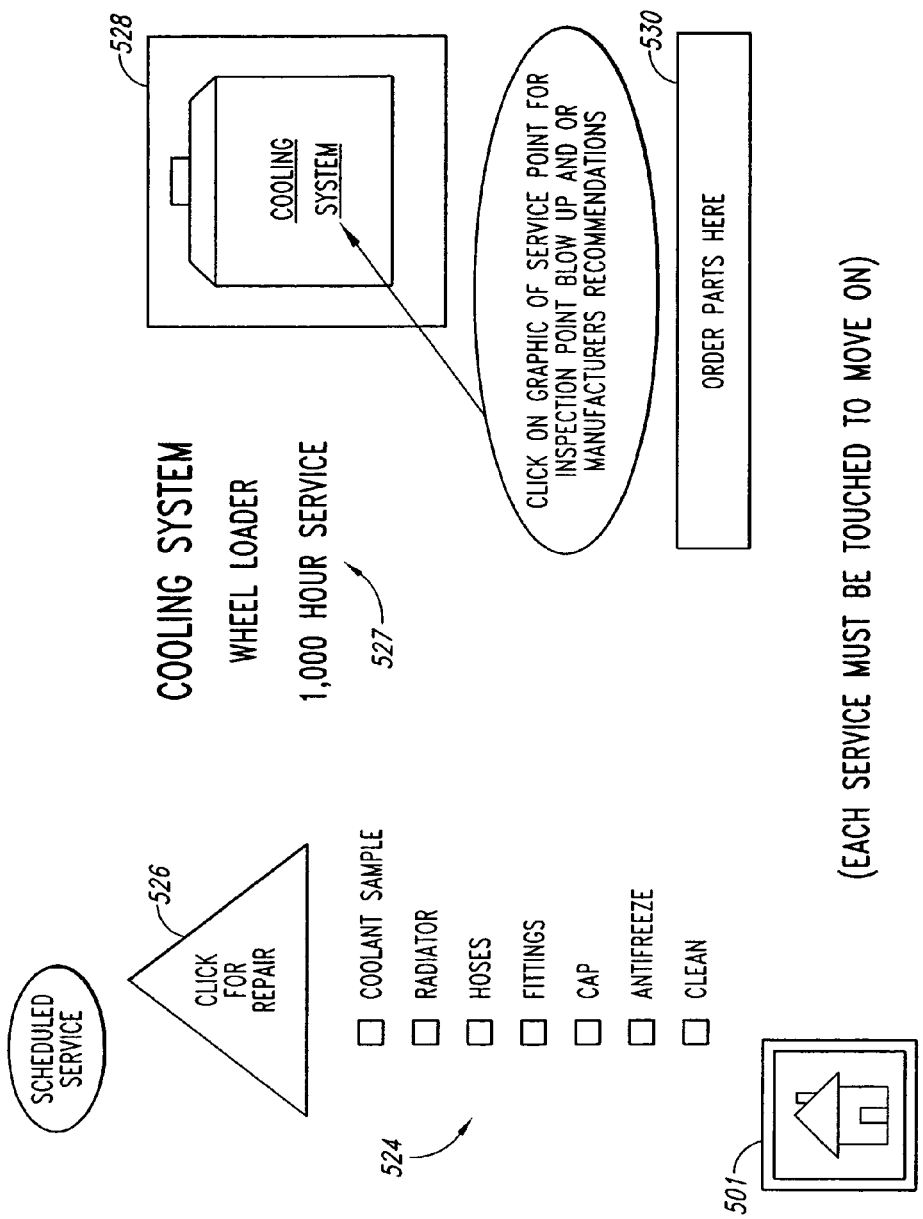

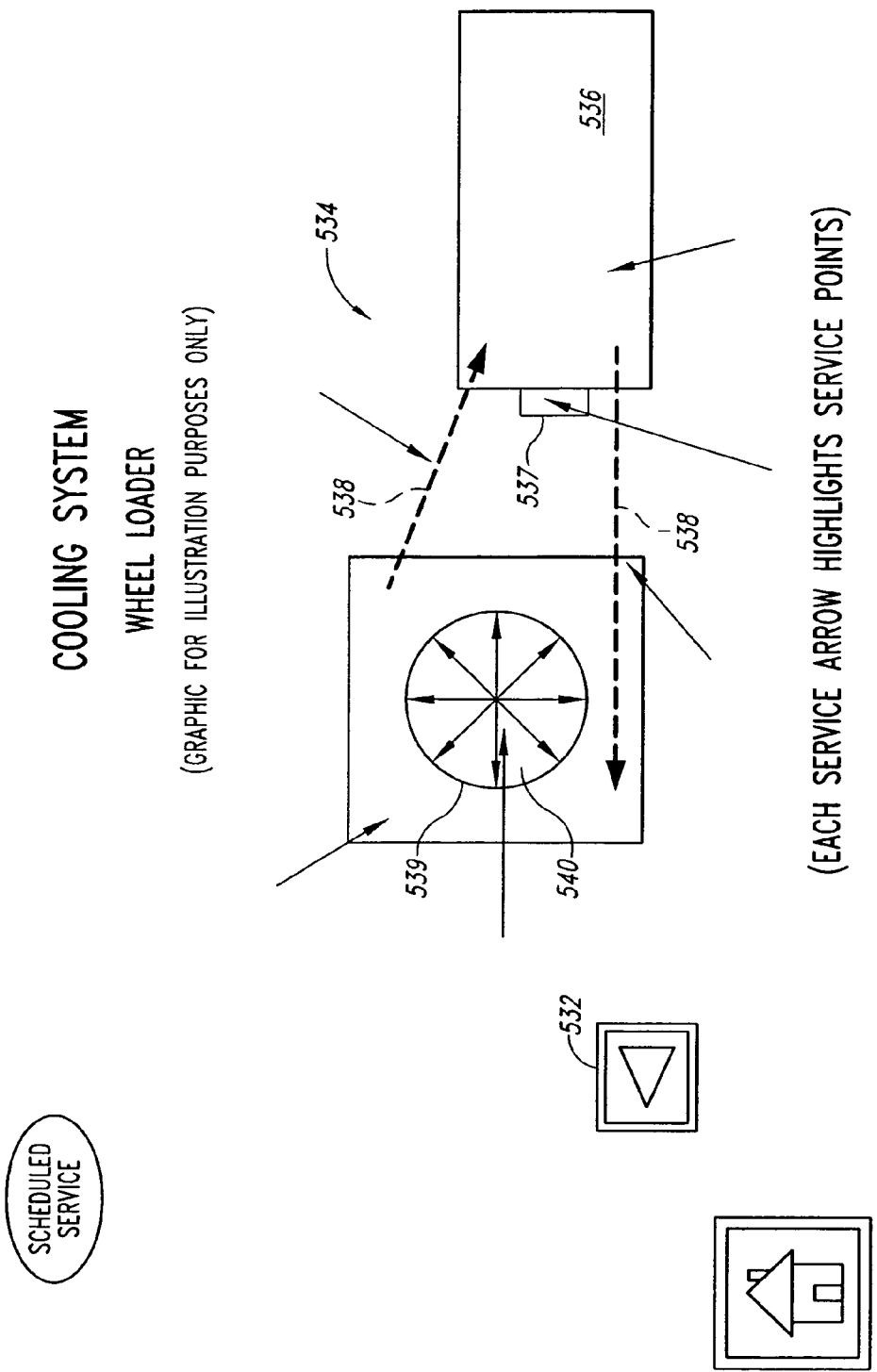

EQUIPMENT TRACKING SYSTEM AND METHOD

CROSS-REFERENCE TO RELATED APPLICATION

This application claims the benefit of U.S. Provisional Application 60/362,868 entitled EQUIPMENT TRACKING SYSTEM AND METHOD, filed Mar. 8, 2002, which is incorporated herein by reference.

TECHNICAL FIELD

The present invention relates generally to a computer system and method for tracking equipment information, and more particularly, to a system and method for tracking and recording equipment information related to the inspection, service, maintenance, and repair of equipment by users in the field.

BACKGROUND OF THE INVENTION

Inspection, service, maintenance and repair of equipment, whether it is an individual piece of equipment or an entire fleet, often requires a large investment of money and time. Performing such activities are not an option for those whose business rely on the continued operation of the equipment in their fleet. In order to keep equipment in good working order, regular inspection, service, maintenance and repair are a must. In some instances, regular equipment inspection and service are required by governmental regulations. For example, all commercial busses and trucks are required by Federal and State law to have a driver vehicle inspection report completed prior to each days use. Records of the daily inspection must be kept for a specified period of time in order to allow regulatory agencies to audit the reports. As one can imagine, the storage and organization of the inspection reports can become quite cumbersome. Another example in which equipment inspection is mandatory is related to aircraft. More specifically, all aircraft are required by Federal Aviation Administration regulations to have a physical pre-flight inspection prior to every flight. However, the process of performing the inspection does not need to be documented. As a result, the inspection is often cursory. Where the pilot may not be attentive, and the inspection is performed from memory, inspection points on the aircraft may be completely missed. Thus, in some instances, regular inspection, service, maintenance, and repair of a fleet of equipment is required and not an option.

Owners of a fleet of equipment are also driven by economic reasons to regularly perform inspection, service, maintenance and repair of their equipment. It is well recognized that regular equipment inspection and service can be helpful in prolonging the operating life of the equipment. Additionally, recording the inspection and service history can provide valuable information that may be used during failure analysis of equipment break-down and the subsequent repair. That is, having a history of the equipment can be used to determine a failure mode and expedite repair. However, as previously discussed, recording and maintaining documentation related to the regular inspection and service of equipment can be a daunting proposition, especially where the fleet of equipment is large and/or complex.

Thus, taking the traditional approach to tracking and recording equipment information for a fleet of equipment introduces a whole host of problems. There are problems related to the cumbersome nature of maintaining and organizing documentation related to the inspection, service, maintenance, and repair of the equipment. Documents require space for storage and are difficult to manage when the number of documents is large. Documents are easily misplaced or destroyed. Technology has been leveraged to some degree in addressing some of the issues that have arisen when taking the traditional approach to tracking and recording equipment information for a fleet of equipment. For example, information recorded on the documents are often transferred into a computer system where the data can be easily manipulated and stored in a organized manner. However, many hours are spent entering the recorded data from documents into a computer system where the recorded data can be analyzed. The additional costs of employing people to simply transfer data from the documents to a computer system are in many cases prohibitive and many businesses are unwilling to bear the additional expense.

Other problems related to the traditional approach include incomplete or cursory inspection procedures, as well as lost documentation. For example, in many cases the process of inspecting equipment in the field is performed from the memory of the individual performing the inspection. This situation presents several problems. The individual inspecting the equipment may become distracted during the inspection and forget at what point the inspection was interrupted, thus, when resuming the inspection, an area of the equipment that should been inspected is overlooked. Also, it is generally the case that without an inspection checklist, an individual is more likely to rush through the inspection process and not perform the inspection of the equipment with the level of scrutiny required. Even where an inspection checklist is provided, and an inspection report completed, there is no guarantee that the report will in fact be turned in and filed away. Inspection reports can be lost or accidentally destroyed, this may especially be the case where the inspection is performed in the field.

Therefore, there is a need for an alternative system and method for tracking and recording equipment information related to inspection, service, maintenance, and repair for a fleet of equipment.

SUMMARY OF THE INVENTION

The present invention is directed to a system and method for tracking and recording equipment information, such as inspection, service, maintenance, and repair information related to any number of equipment. The system includes a device having a display and through which data can be entered and received. The system further includes inspection, service, and repair components. The inspection component requests a system to provide an inspection checklist for a requested equipment for display on the device in response to an inspection request. The service component requests the system to provide service information for various service points of the requested equipment for display on the device in response to a service request. The repair component requests the system to provide repair information for the requested equipment for display on the device in response to a repair command.

BRIEF DESCRIPTION OF THE DRAWINGS

FIGS. 5a and 5b are representative equipment pages displayed for an Inventory Tracking option selected from the option page of FIG. 4.

FIGS. 9a and 9b are representative graphical interfaces displayed on a portable data device of an equipment tracking system according to an embodiment of the present invention for a Daily Lubrication option.

FIGS. 10a–10d are representative graphical interfaces displayed on a portable data device of an equipment tracking system according to an embodiment of the present invention for a Scheduled Service option.

DETAILED DESCRIPTION OF THE INVENTION

Embodiments of the present invention are directed to a system and method for tracking and recording equipment information. Certain details are set forth below to provide a sufficient understanding of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
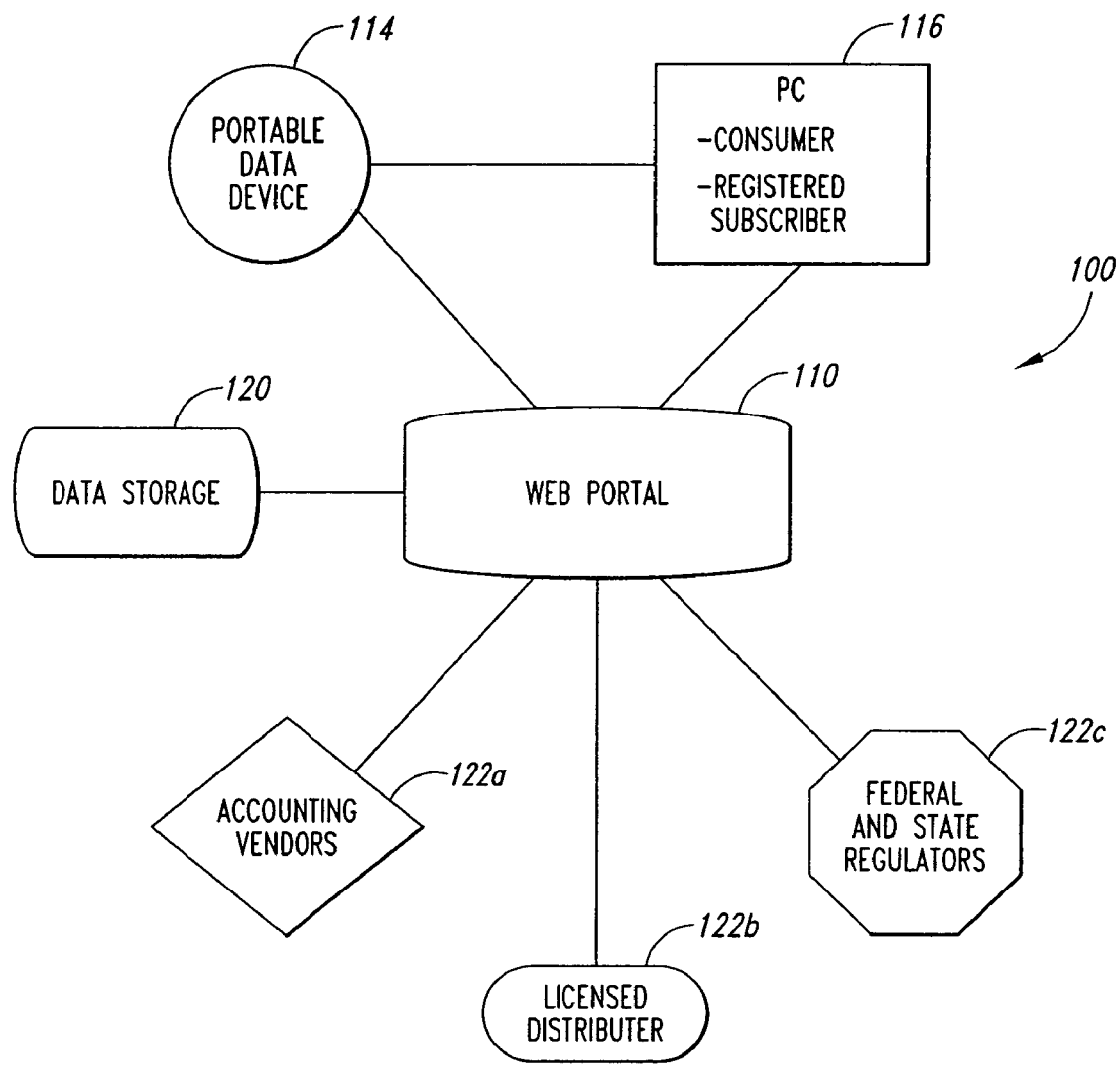
FIG. 1 is a block diagram of an equipment tracking system according to an embodiment of the present invention.

Illustrated in FIG. 1 is an equipment tracking system 100 according to an embodiment of the present invention. As described herein, the equipment tracking system will be discussed with respect to its use in tracking a fleet of heavy construction equipment. However, the specific details provided herein are provided by way of example. It will be appreciated that the equipment tracking system 100 can be used for tracking various types of equipment. Some examples include tracking and recording equipment information for a fleet of aircraft, military and governmental fleets, busses, such as for public transit, schools, or commercial transportation, highway trucks, agriculture equipment, medical equipment, power generation, climate control and refrigeration equipment, elevators, cranes, crushers, conveyors and the like. These types of equipment generally require regular or periodic inspection, service, maintenance or repair. Moreover, it will be appreciated that embodiments of the present invention can be used to track equipment information for any number of equipment, ranging from a single piece of equipment to an entire fleet. The tracking and recording of information related to these operations are facilitated by an equipment tracking system according to an embodiment of the present invention.

As illustrated in FIG. 1, an embodiment of the equipment tracking system 100 is implemented by a computer server connected to the user through a network, such as the Internet, and will be described herein with respect to this implementation. However, it will be appreciated that in another embodiment, the equipment tracking system 100 can also be implemented in a stand alone personal computer (PC), or alternatively, by a computer server connected through a local area network (LAN). Those of ordinary skill in the art have sufficient understanding from the description provided herein to practice various embodiments of the present invention.

The equipment tracking system 100 includes a Web portal 110 that is accessed via the Internet and is a subscription service that is available to a user for payment of subscription fees. The equipment tracking system 100 includes a Web portal 110 through which a portable data device 114 having access to the network, such as a personal digital assistant (PDA) or a cellular telephone, can communicate with a personal computer (PC) 116 and a data storage 120 and access various equipment information and data related to the user's fleet of equipment that is stored in a data storage 120. Such equipment information may include equipment inspection information, equipment service and repair records, and the like. The types of equipment information that can be stored by the data storage 120 will be discussed in more detail below.

It will be appreciated that access to the network by the portable data device 114 and PC 116 of the equipment tracking system 100 can be provided using conventional techniques and conventional communication media, such as conventional wired technology using known data transfer protocols, conventional wireless media using known data transfer protocols, a conventional cellular communication network, and the like. It will be further appreciated by those ordinarily skilled in the art that the equipment tracking system 100 merely represents an embodiment of the present invention, and modifications can be made thereto without departing from the scope of the present invention. For example, the portable data device 114 has been previously described as being a PDA. However, as appreciated by those of ordinary skill in the art, the portable data device 114 can be implemented by other conventional data devices that can transmit and receive information, such as an Internet capable cellular telephone, an alphanumeric pager, or the like. Such conventional data devices are well known and the description provided herein will provide those ordinarily skilled in the art with sufficient understanding to enable embodiments of the present invention to be practiced. In an embodiment utilizing an Internet capable cellular telephone, information can be transmitted to and from the phone using existing cellular infrastructures to the advantage of the user. As will be apparent to those ordinarily skilled in the art, having the capability to transfer information to the portable data device 114, as well as from the portable data device 114, in a wireless medium provides many advantages when applied in embodiments of the present invention. For example, Internet capable cellular can communicate with a server in real time, and do not need to be periodically "docked" or hard wired to transfer data to or receive data from the server. Additionally, cellular phones are very portable, and can be easily carried by users who regularly work in the field. An advantage provided by the compact form factor of cellular phones is that the portable data device 114 does not need to stay with a specific vehicle or equipment, but rather, can be assigned to a user who may have responsibility over several vehicles or equipment, and can easily retrieve and access information for different vehicles when desired, As mentioned previously, Web portal 110 can be accessed via the Internet. Providing channels of communication sufficient for the purposes described herein are well known in the art. For example, PC and wireless Internet access through the portable data device 114 is currently available and known by those of ordinary skill in the art. In an embodiment of the present invention, the portable data device 114 includes a touch-sensitive display that can be used or data entry. Such touch-sensitive displays are well known in the art. Consequently, the description provided herein is sufficient to enable those of ordinary skill in the art to practice the present invention.

In another embodiment of the present invention, the user can additionally take advantage of various references and functionality that are also accessible through the Web portal 110. As illustrated in FIG. 1, the Web portal can provide access to third parties 122, such as the software of accounting vendors 122a that are generally used to organize and operate on data stored by the data storage 120, information related to the equipment in the user's fleet as provided by licensed distributors and manufacturers 122b of the equipment, and by federal and state regulators 122c. For example, vendors such as Dexter and Chaney, J. J. Keller, Omni Fleet, and Arsenault Associates currently provide large fleet PC based accounting software solutions. In cooperation with vendors such as these, the user will be able to utilize the proprietary accounting software and integrate the user's stored equipment information with proprietary accounting software for analysis and documentation. In the case of equipment manufacturers 122b, relevant manufacturer's specifications, products, and graphics can be integrated with all of the relevant inspection, service, and repair data in the equipment tracking system 100. For example, to facilitate inspection, service, repair, and maintenance of equipment, manufacturer's parts records, service and update recommendations, owners and operators recommendations, and service point locations can be downloaded onto the portable data device 114 for in field use. Manufacturers will also be able to post service alerts and bulletins specific to any machine or system present in the user's fleet. In addition to the features previously discussed that may be made available to a user through the Web portal 110, such features as industry news, user tips and editorials, and user support and storage can also be provided.

Figure 2:
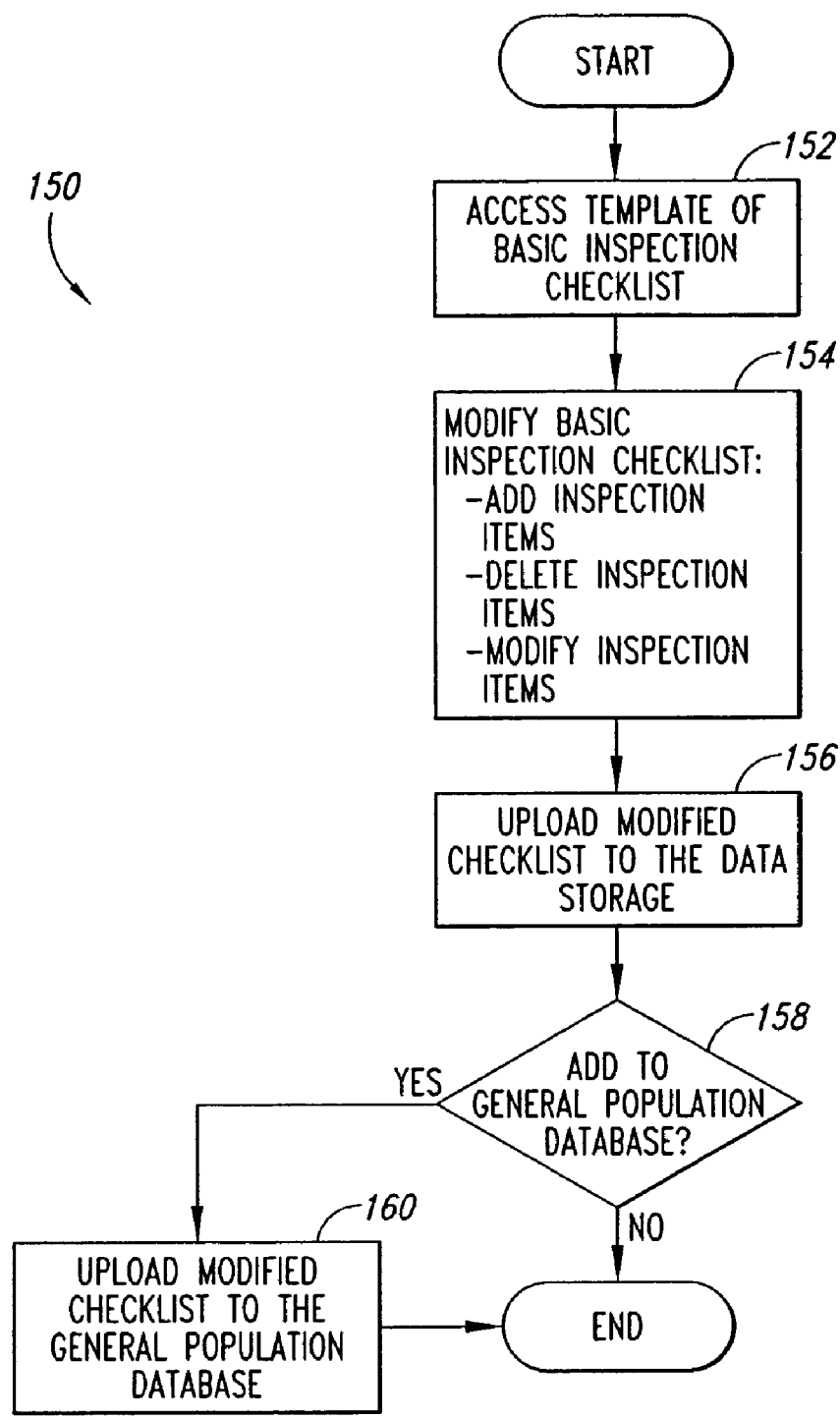
FIG. 2 is a flow diagram of a checklist customization process according to an embodiment of the present invention.

In one embodiment of the equipment tracking system, the user will be able to store user created templates and allow other users to benefit from their development. That is, the information can be entered by the users support office utilizing a product appropriate template on their office PC. (i.e. Commercial Truck). The template, if found to be generally useful, can then be added to the general population data base. This is, a user can build an inspection, maintenance, and repair process for a unique piece of equipment, and then enter the unique machine process into the general system for use by all users. For example, a flow diagram 150 shown in FIG. 2 illustrates a process of customizing a basic vehicle inspection checklist tailored to the user's inspection process. At a step 152, the template of the basic inspection checklist is accessed by the user. Access can be made via the PC 116 or the portable data device 114, or by other conventional means as well. At a step 154, the user modifies the basic inspection checklist by adding inspection items, deleting inspection items, or modifying the inspection items. For example, in one embodiment of the present invention, the basic inspection checklist covers mandatory inspection items under U.S. DOT sec. 396, Driver Vehicle Inspection Report administered by the Federal Motor Carrier Association. However, the use can add inspections items to the basic inspection checklist to exceed the minimum requirements set out under the regulation. Moreover, a user can add further detailed "sub-lists" for each of the inspection points to provide guidance as to the specific items that should be inspected for the inspection point. At a step 156, the modified checklist is uploaded to data storage for future access by the user (or employees of the user, such as drivers, mechanics, and the like). At a step 158, the user is given the option to add the customized inspection checklist to a general population database, which allows third parties to use the modified checklist if desired. Where the user decides to allow only those authorized to access the checklist, no other steps need to be taken. However, if the user would like other parties to access the modified checklist, at a step 160, the checklist is uploaded to the general population database where it is made readily available.

In an alternative embodiment, the accounting vendors 122a, licensed distributors 122b, and federal and state regulators 122c also have access to the equipment information stored by the data storage 120 to facilitate transactions between the accessing entity and the user. For example, at the request of the user, the Web portal 110 can be used by federal and state regulators to access inspection reports for the user's fleet of equipment, which are often required by government regulations and are periodically audited by various regulatory agencies to ensure that proper equipment inspections have been performed by the user. As previously mentioned, many unique equipment pieces are required by federal and state law to have documented, accurate inspection, service and repair data available to a governing agency. Although legal codes vary, access to this data by the corresponding organization is cumbersome at best. Current inspection tools limited to paper and pencil logbooks are stored for later inspection by regulating agencies. These reports are more often incomplete, leaving out vital operator and equipment information. These inaccuracies often create unsafe equipment resulting in lost revenue and legal fines. However, through the Web portal 110, various regulatory agencies will be provided access to the relevant equipment data. This system provides many unique advantages to both the governing bureau and equipment owner. For example, benefits for the regulating agency include instant inspection, service and repair reports on any equipment in the system, the relevant data can be formatted to agency's needs, instant confirmation and comment of the data, less paper and field research, and greater reporting accuracy and accountability. As for the equipment owner, providing access to regulatory agencies will provide automated compliance, automatic archive quality backup of all data, and greater accuracy and accountability.

The equipment tracking system 100 provides a user with the ability to track and record equipment information related to the inspection, maintenance, service and repair of the user's fleet of equipment. Through the use of the portable data device 114, the user has the ability to track and record equipment information in the field, thus, providing the user with tremendous flexibility with respect to the user's ability to inspect, service and repair fleet equipment efficiently. An example of the types of equipment information that can be tracked and recorded through the portable data device 114 is provided by a Machine Service Record option that can be selected by a user in the field. This option provides the user in the field the ability to track and record daily inspection information for the equipment in the user's fleet, daily lubrication information, scheduled service, repair information, oil sample information, and machine location information. A more detailed description of the process of tracking and recording of such information through the Machine Service Record option is provided below. In addition to the previously described types of equipment information, the user may have at its disposal various references and information related to equipment in the fleet through the portable data device 114. For example, industry tables, part numbers, filter numbers, fluid requirements, air pressure recommendations, owners and operators manuals, and warranty information for the particular fleet equipment. In some embodiments of the present invention, the user is provided with the ability to order equipment parts through the portable data device 114 while in the field. In other embodiments, equipment check-in and check-out information, as well as equipment appraisal information, is made available to a user in the field through the portable data device 114. With respect to equipment appraisal information, the user can access inspection, service and repair records related to the equipment being appraised by using the portable data device 114. The ability to access this type of information during the process of appraising equipment in the field provides a great convenience and is valuable in making accurate appraisals.

The portable data device 114 may also incorporate standard functions that are well known in the art. These may include functions such as a multi-function calculator, calendar function, voice recorder, digital messaging, two-way and digital phone capabilities, ability to take and store digital photographs, storage of contact information, Global Positioning System (GPS), and barcode scanning. The list of functions previously provided by the portable data device 114 is not intended to be comprehensive, and it will be appreciated that additional functions can be made available as well.

It should be noted that use of the term "user" herein is meant in the general sense, and not intended to refer to one particular person. The term "user" is broad enough to include multiple fleet personnel. In fact, an advantage of embodiments of the present invention is that they provide a system that integrates the use of multiple personnel involved with the inspection, service, maintenance and repair of fleet equipment. For example, an equipment operator is given the responsibility of performing pre-use inspections and damage review, both of which can be performed and recorded through the use of the portable data device 114. Thus, an ongoing record can be maintained for each piece of equipment of the fleet. A field mechanic can then use the portable data device 114 to access, review and update inspection, service and repair history for the fleet equipment while in the field and benefit from the recorded history. Additional information that may be stored by the data storage 120 and be of some benefit to the field mechanic include oil sampling information, the last mechanic to service the equipment, the time of the last lubrication, fuel and fluid quantities, and current warranty status. A yard supervisor can benefit from the inspection and damage information recorded by the equipment operator when logging incoming and outgoing equipment, as well as perform additional inspections or take photos of the equipment to complete damage reports. These are just a few examples of how the equipment tracking system 100 can integrate the use of multiple fleet personnel.

As previously mentioned, the Web portal 110 can be accessed via a PC 116 as well as the portable data device 114. Although the PC 116 can have similar options and functionality to those previously described with respect to the portable data device 114, the PC 116 can also provide alternative options that may not be as desirable or necessary for those users having access to the Web portal 110 through the portable data device 114. It will be appreciated, however, that access to the following options may still nevertheless be made available through the portable data device 114 where desirable. Some of the options are discussed below with respect to FIG. 3.

Figure 3:
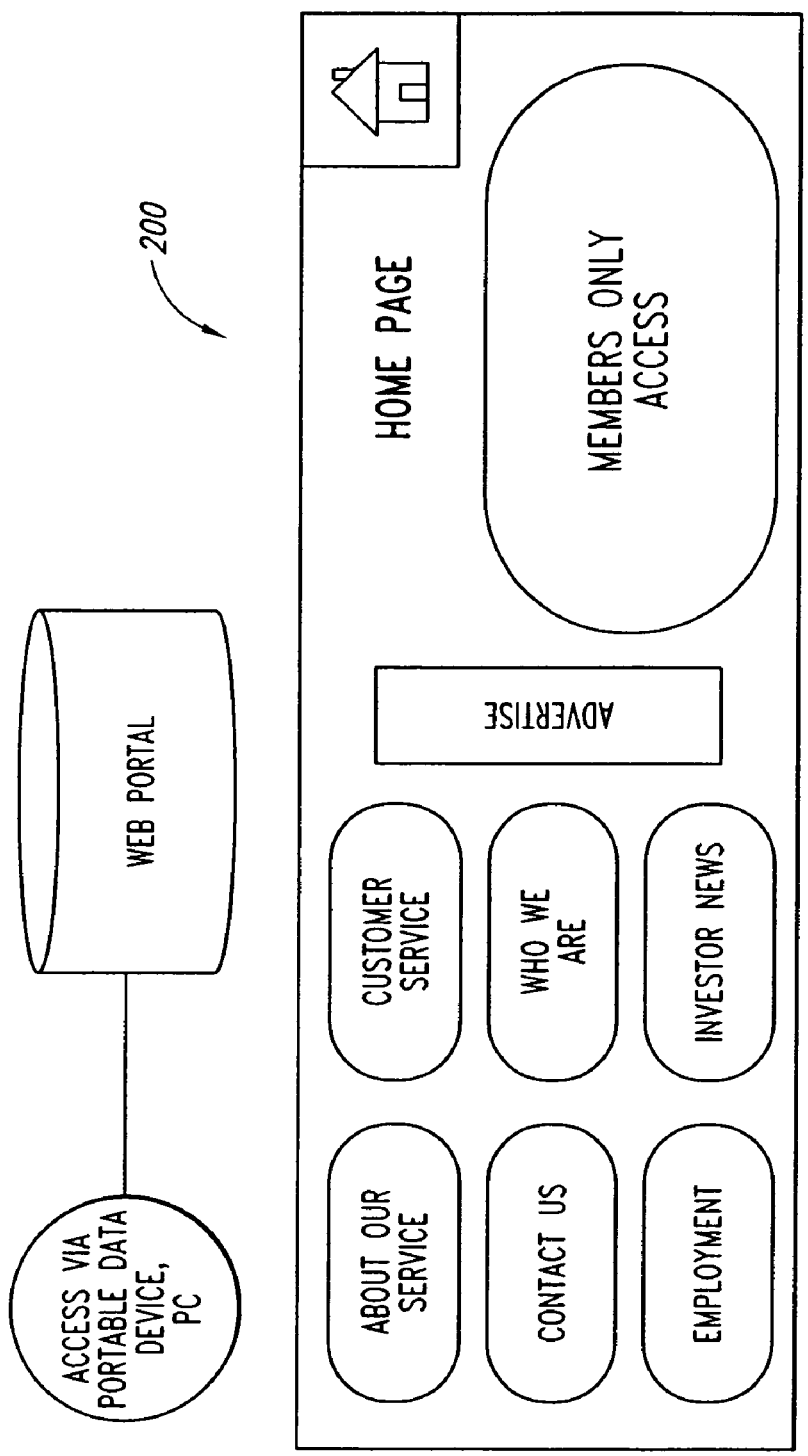
FIG. 3 is a representative home page displayed when accessing the equipment tracking system of FIG. 1.

FIG. 3 illustrates an example of a screen-shot 200 from the PC 116 when accessing the Web portal 110 through the PC 116. It will be appreciated, however, that the screen-shot 200 of FIG. 3 is provided by way of example, and is not intended to limit the scope of the present invention to the particular embodiment illustrated therein. The screen-shot 200 includes various user options that can be selected to provide the corresponding information. Of particular interest is a Members Only Access option 202 that can be selected by a user to access equipment information for the user's fleet stored by the data storage 120 (FIG. 1), as well as other functions and options available to subscribing members of the Web portal 110. Access through the Members Only Access option 202 is restricted, and consequently, a login identifier and a password should be used to limit access to subscribing users. Alternative means of securing access through the Members Only Access option 202 are well known in the art, and can be implemented without departing from the scope of the present invention.

Figure 4:
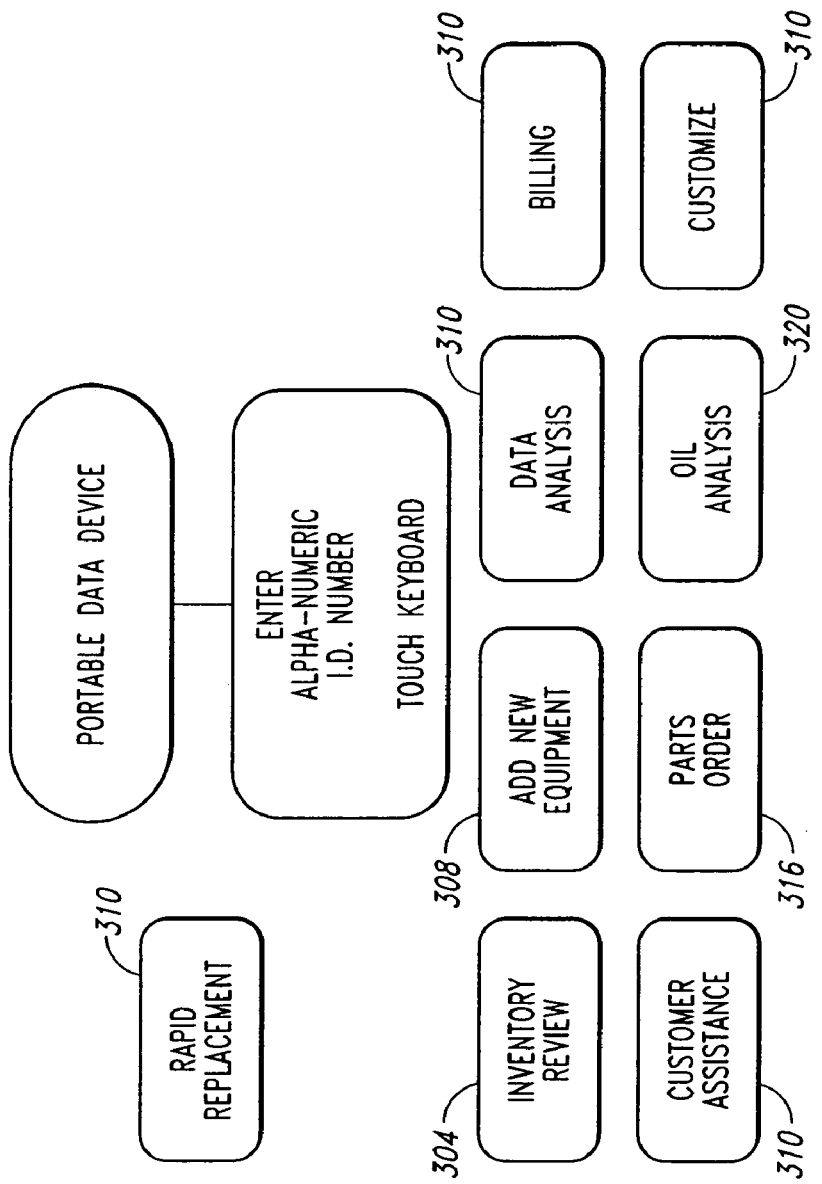
FIG. 4 is a representative option page displayed when the equipment tracking system has been entered.

FIG. 4 illustrates some examples of the types of functions and options that may be made available to subscribing users of the Web portal 110. An Inventory Review option 304 can be selected by the user to review the inventory of the user's fleet of equipment. The inventory information for the fleet can be organized and displayed in different ways, such as by location, by division, by job site, or the inventory for the entire fleet can be viewed without any particular arrangement. As shown in FIG. 5a, where the inventory information for the fleet is to displayed by division, icons 402 representing the various categories of equipment types are displayed for selection by the user. It will be appreciated that the icons 402 can be graphical representations of the particular type of equipment, instead of the circles shown in FIG. 5a. In the present example, the Wheel Loaders category 402g is selected to view the inventory of equipment falling within that division. In response to the selection of the Wheel Loaders category 402g, icons 410 representing the equipment within this division are displayed with information such as model number 420, identification number 422, and the time at which the last service was performed 424. Also provided is an icon 421 indicating that the current information displayed is related to wheel loaders. Through this option, a user can quickly review the service status of the fleet equipment belonging to the Wheel Loaders category 402g. It will be appreciated that in alternative embodiments of the equipment tracking system 100, the type of information that is displayed with the icons representing the equipment can be different, that is, more or less information can be displayed with the icons 410 without departing from the scope of the present invention.

Figure 5B:
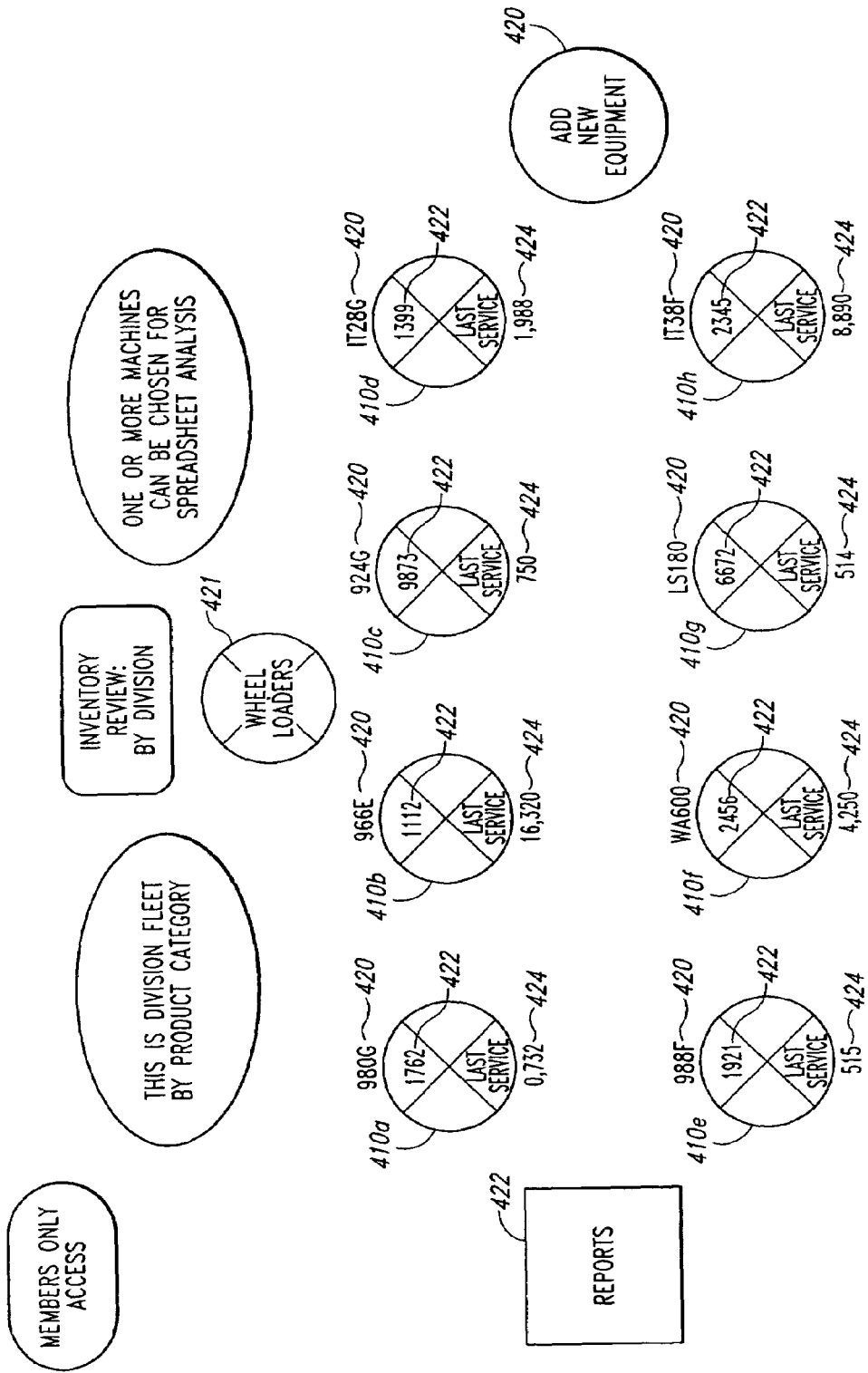

Additional options may be made available from the graphical interface of FIG. 5b. As illustrated therein, a Reports option 423 provides the user with the option of having an inventory report displayed instead of displaying icons 410 representing the equipment in the inventory. An Add New Equipment option 420 is also provided in FIG. 5b. It is through this feature that a user can add additional equipment to the inventory information for the user's fleet. Typically, the type of information that is provided by the user when adding new equipment will include the equipment type, the make and model of the equipment, and the serial number. However, additional or different types of information can be entered as well. The previously described Add New Equipment option 420 is the same as the Add New Equipment option 308 that is illustrated in FIG. 4. As the Add New Equipment options 308, 420 illustrate, access to an option or feature can be made from multiple locations.

In addition to the Inventory Review and Add New Equipment options 304, 308, other options such as those shown in FIG. 4 can be made available to the user. A Parts Order option 316 enables the user to order equipment parts for repair or service of fleet equipment. An Oil Analysis option 320 enables the user to access oil analysis reports for the fleet equipment when desired. For example, this information may be useful where a field mechanic is investigating the failure mode in order to determine and carry out the appropriate repairs on the equipment. Additionally, options 310 such as Rapid Replacement, Customer Assistance, Data Analysis, Billing, and Customize options can be provided as well. As previously mentioned, the options illustrated in FIG. 4 have been provided by way of example, and do not represent a comprehensive list of the options that can be made available to the user.

As previously mentioned, the portable data device 114 (FIG. 1) enables users in the field to access the Web portal 110 to obtain and enter information about their fleet. In this way, users in the field have information and references concerning the equipment in their fleet at their fingertips without the cumbersome nature of traditional paper references and record-keeping practices. The following description of the operability and functionality of a portable data device 114 is provided by way of example. It will be appreciated that many of the details provided in the following example may be modified without departing from the scope of the invention.

Figure 6A:
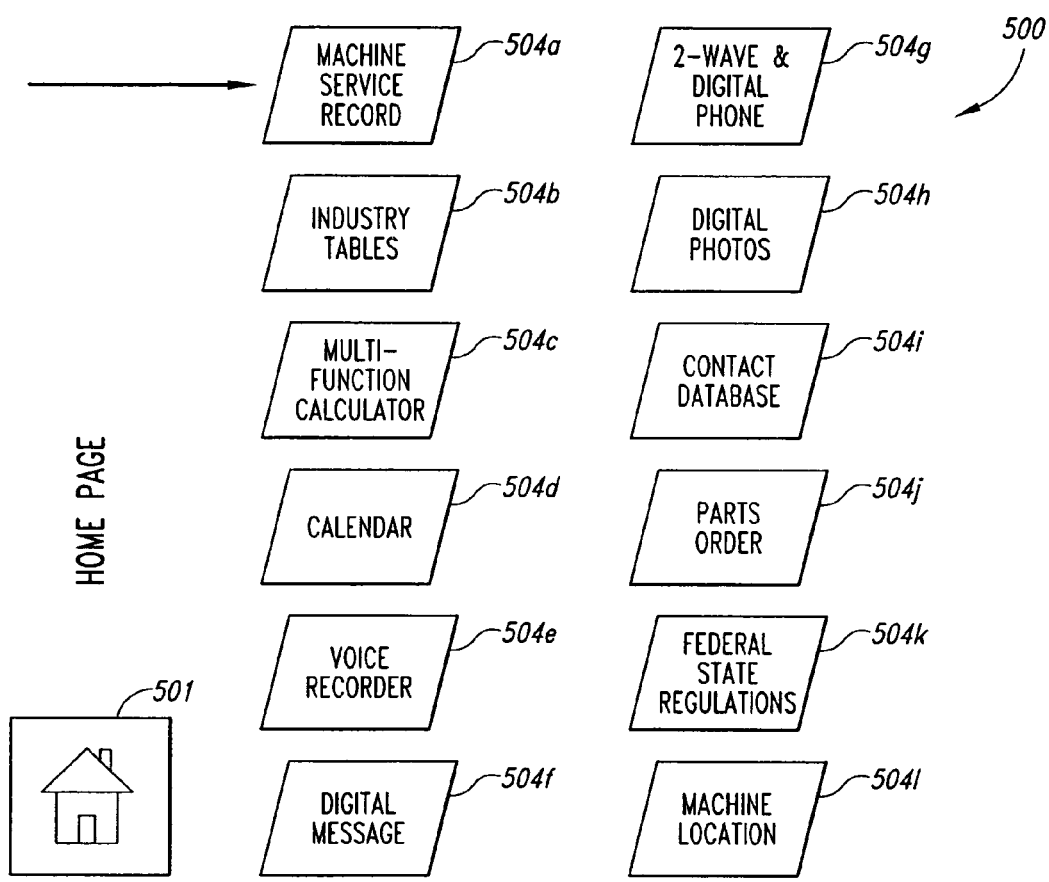
FIGS. 6a–6c are representative graphical interfaces displayed on a portable data device of an equipment tracking system according to an embodiment of the present invention.

FIG. 6a illustrates an example of a graphical interface for the portable data device according to an embodiment of the present invention. A menu screen 500 as shown in FIG. 6a is displayed on the screen of the portable data device 114. The menu screen 500 provides various user options and links, such as a quick "Home" access icon 501 which can be selected to return to the homepage, as well as options related to the inspection, service, and repair of fleet equipment, as well as links to references, including those related to equipment and service references and general references as well. As illustrated in FIG. 6a, various options are displayed in the form of icons 504a-1, which can be used to select the particular option. In the embodiment of FIG. 6a, the user options include many of the options previously discussed, for example, Industry Tables, Multi-function Calculator, Calendar, Voice Recorder, Digital Messaging, Two-way and Digital phone, Digital Photographs, Contact Information, Global Positioning System, Parts Ordering, Federal and State regulations, and Machine Location. In the interest of brevity, not all of the options will be described in detail herein because they are well known to those of ordinary skill in the art. As previously mentioned, the options that are illustrated in FIG. 6a are not intended to be comprehensive list of all possible options, and it will be appreciated that additional functions can be made available as well.

In an embodiment of the present invention, secure access to the menu screen shown in FIG. 6a is provided by way of a personal identification number (PIN) and associated password that are requested prior to obtaining access to the menu screen. Additionally, various levels of access privileges may be associated with the account identified by the personal identification number. In this manner, access to various data may be controlled through the use of privileged accounts. Entry of the personal identification number may be made through conventional means, such as the use of a stylus or a touch-screen keypad. It will be appreciated, however, that entry of the personal identification number may be made by way of other data entry means, such as voice recognition, barcode reader, manual keypad, biometric identification, and the like.

In the present example, the Machine Service Record option 504a of the menu screen has been selected by the user. Following the selection of the Machine Service Record option 504a, the user is prompted to provide information identifying a particular machine, such as machine number, as well as provide information related to the particular machine, such as number of machine hours, vehicle mileage, and the like. The information requested from the user can be entered into the portable data device 114 in the same manner as previously discussed with respect to user PIN and password. As will be discussed in more detail below, information provided to the user via the portable data device 114 may be based on the number of machine hours entered by the user. For example, the particular service points on the equipment may vary according to the number of machine hours entered by the user.

Figure 6B:
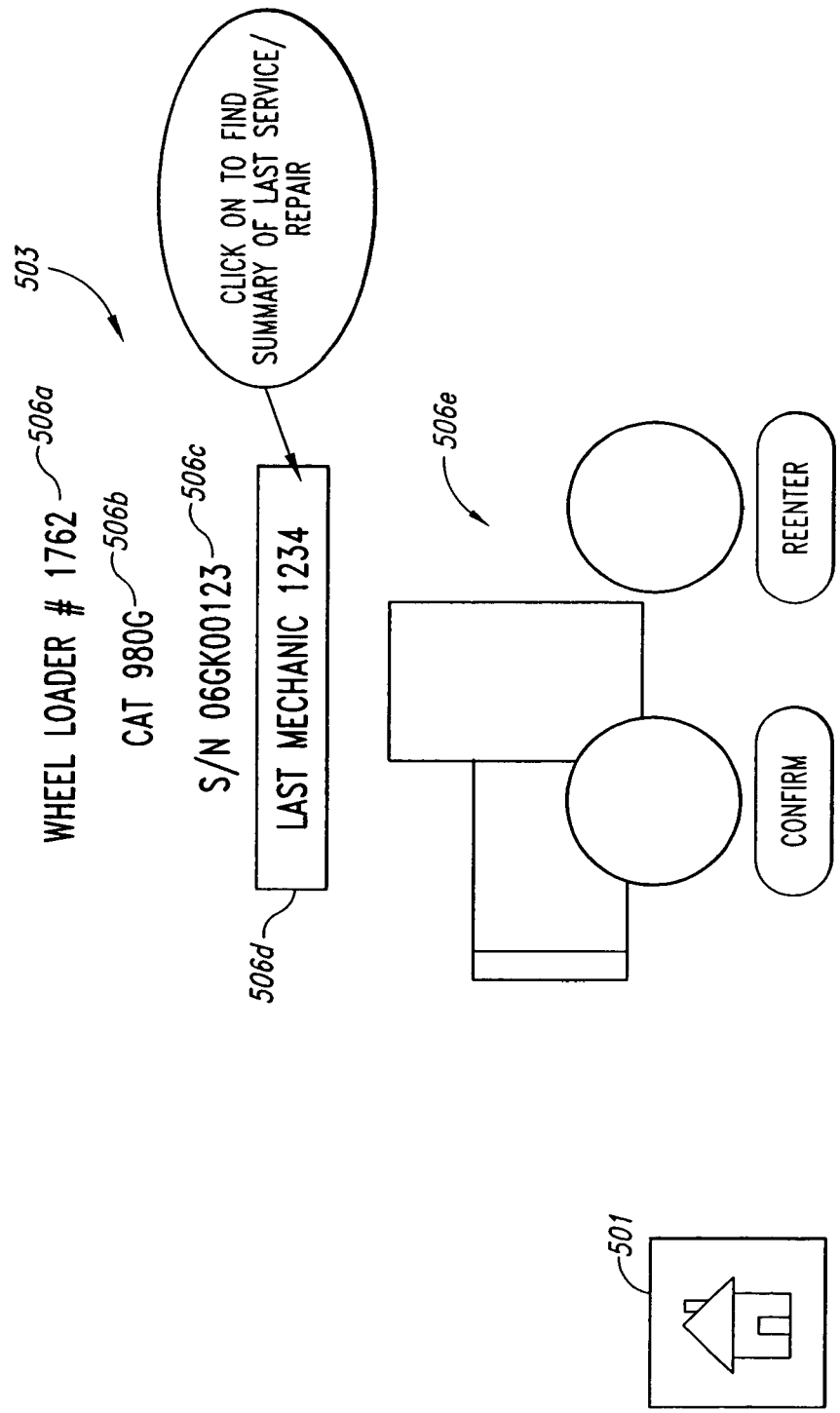
Figure 6C:
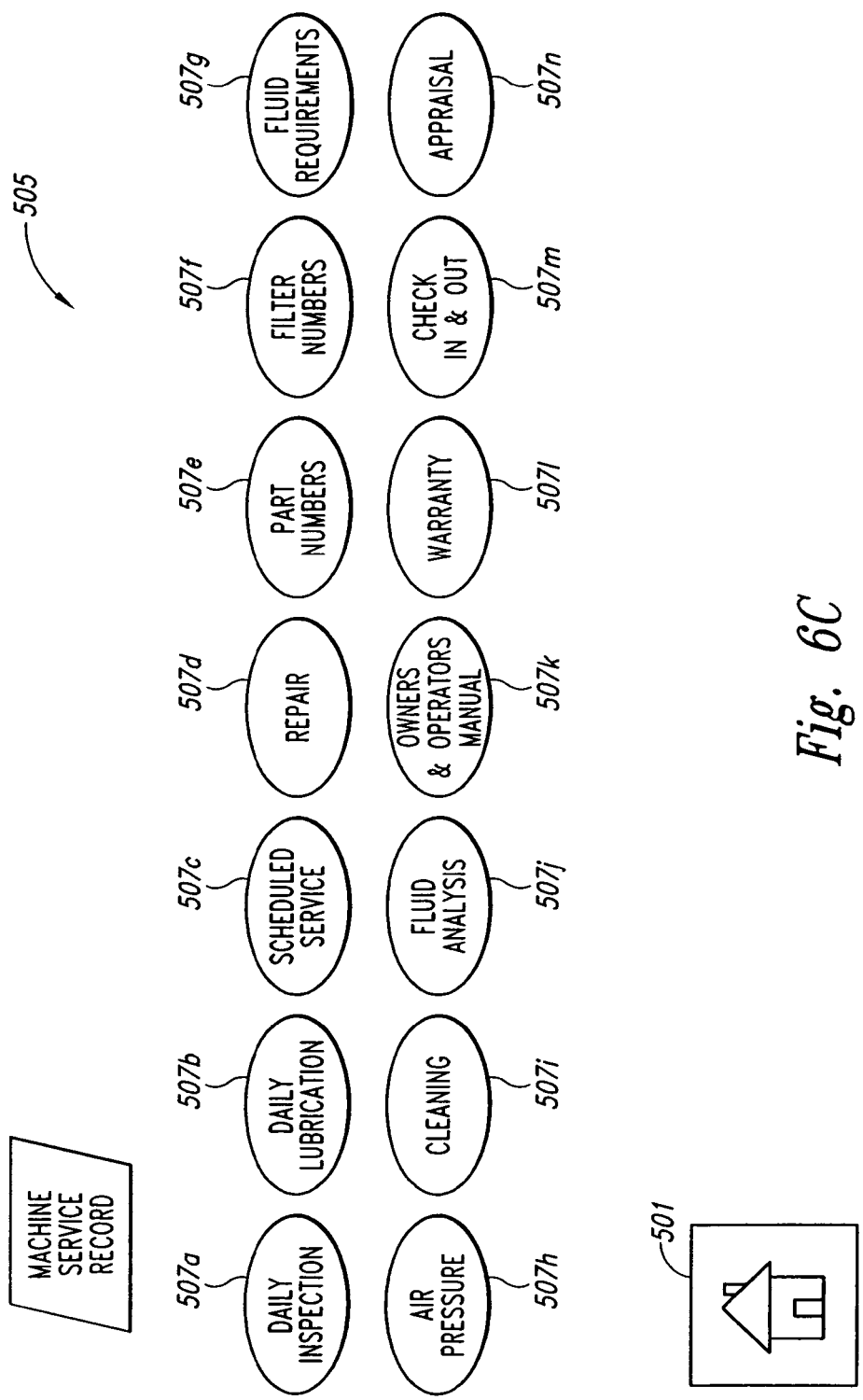

Upon entry of the machine number and number of machine hours, information for the equipment selected by the user is retrieved and displayed in a graphical interface 503 such as illustrated in FIG. 6b. For example, displayed in the graphical interface 503 of FIG. 6b are the equipment type and machine number 506a, the equipment model number 506b, the equipment serial number 506c, the identification number of the last user 506d to perform an inspection, service, or repair on the equipment, and a graphical representation of the equipment 506e. In the present example, the equipment corresponding to the machine number entered by the user is a wheel loader. The user can then either confirm that the information retrieved for the equipment is correct, or choose to reenter the machine number and number of machine hours if it appears that the information is not correct. When the user confirms that the information retrieved is correct, the graphical interface illustrated in FIG. 6c is then shown on the display of the portable data device 114. The quick Home icon 501 is also provided for easy navigation through the graphical user interface.

Various options related to the Machine Service Record option are provided to the user. The particular options provided to the user may depend on various factors, for example, equipment type, user privileges, fleet account options, and many others. In an embodiment of a graphical interface 505 illustrated in FIG. 6f, various options are displayed in the form of an icon 507a-n, which can be used to select a particular option. These options include Daily Inspection, Daily Lubrication, Scheduled Service, Repair, Part Numbers, Filter Numbers, Fluid Requirements, Air Pressure recommendations, Cleaning recommendations, Fluid Analysis information, Owners and Operators Manuals, Warranty Information, equipment Check-In and Check-Out information, as well as equipment Appraisal information. However, in the interest of brevity, not all of the options will be described in detail herein because they are well known to those of ordinary skill in the art. As previously mentioned, the options that are illustrated in FIG. 6c are not intended to be comprehensive list of all possible options, and it will be appreciated that additional functions can be made available as well through the Machine Service Record option 507a.

The following description provides details related to the Daily Inspection option 507a provided in the graphical interface 505 of FIG. 6c. However, it will be appreciated that the following details may be modified and still remain within the scope of the present invention.

Figure 7A:
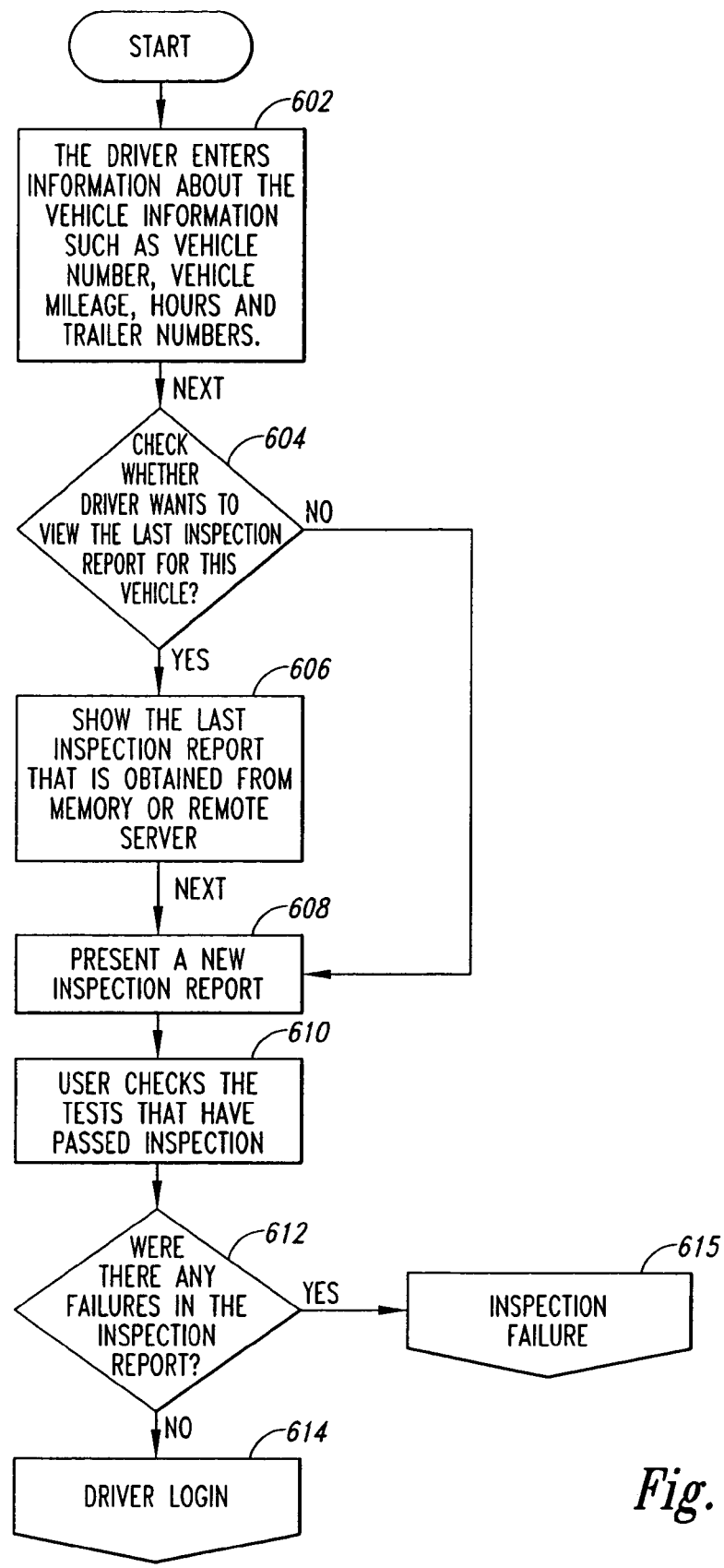
FIGS. 7a–7c are a flow diagram of a Daily Inspection option according to an embodiment of the present invention.
Figure 7B:
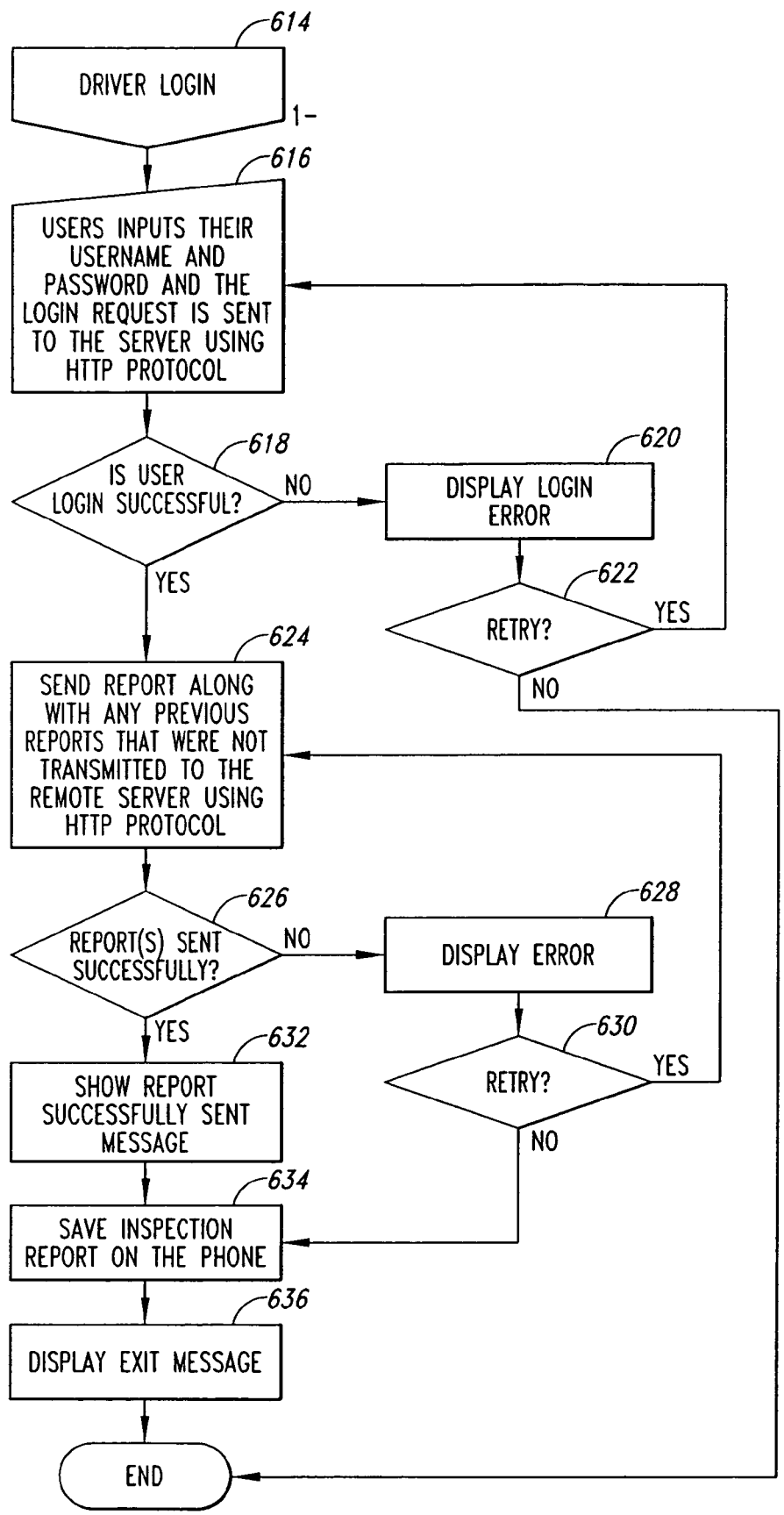
Figure 7C:
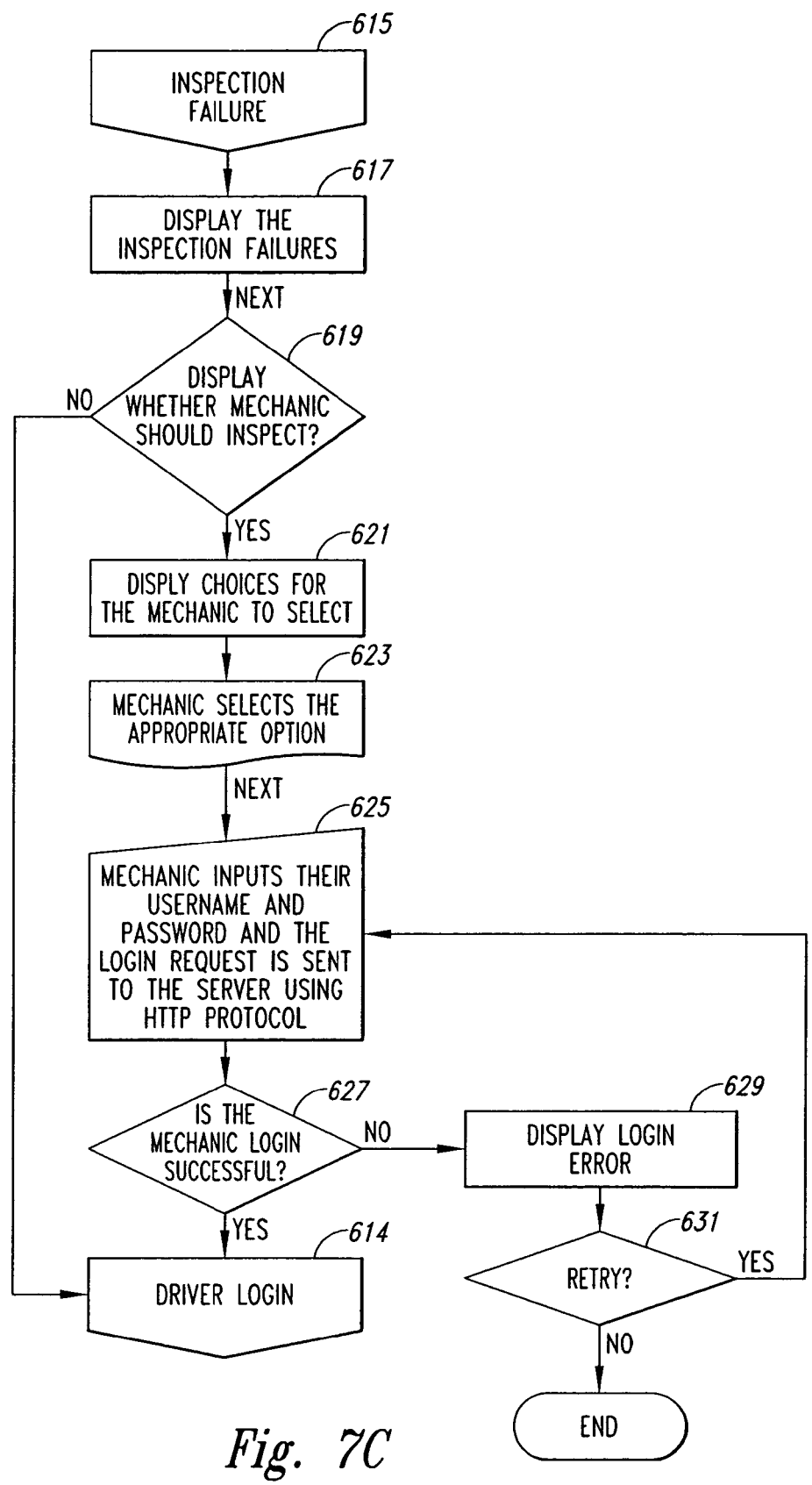

As previously discussed, daily equipment and vehicle inspections are often required to be performed before operating the equipment or vehicle. The Daily Inspection option 507a allows a user to perform the inspection and record the inspection results using the portable data device 114. In one embodiment of the present invention, the Daily Inspection option provides a checklist of items that are to be inspected by a user, with each item being checked off after inspection of the item is complete. FIGS. 7a–7c are a flow diagram 600 of the Daily Inspection option according to one embodiment of the present invention. The flow diagram 600 is directed to the daily inspection of a vehicle, however, those ordinarily skilled in the art will appreciate that various modifications can be made without departing from the scope of the present invention.

At a step 602, the driver enters information about the vehicle to be inspected, such as vehicle number, vehicle mileage, hours, and trailer numbers. At a step 604, the driver is given the option to review the last inspection report for the vehicle. At a step 606, the last inspection report is obtained and presented to the driver. In one embodiment of the present invention, the last inspection report is stored in memory on the portable data device 114, and in the event the driver would like to review the last inspection report, it is retrieved from the memory. However, it may be the case that the driver currently inspecting the vehicle was not the one who performed the previous inspection. Consequently, the last inspection report will need to be obtained from a remote server. Transmission over a wireless medium of the data related to the last inspection report is conventional, and is well known in the art.

After review of the previous inspection report, at a step 608 a new inspection report is provided to the driver on the portable data device 114. In one embodiment of the present invention, the inspection report is in the form of a textual check list, identifying the various inspection points that need to be inspected by the driver. For example, the checklist can include inspection points such as the engine, transmission, clutch, steering mechanism, and the like. A check box can be associated with each of the inspection points on the list, and the driver can progress through the check list, filling in the check box for the inspection point as the driver completes inspection of that point and confirms that the inspection point passes the inspection, as at step 610. Items that do not pass the inspection can be left blank, indicating a failure. At a step 612, the driver can review the inspection report to determine if any inspection point failed the inspection.

If all the inspection points passed inspection by the driver, the inspection report will be transferred to the remote server to store the report. As part of the process of transferring the inspection report, at a step 614, the driver logs into an account to authenticate the inspection report. A process of logging in and transferring the inspection report is illustrated in FIG. 7b. At a step 616, the driver inputs the driver's username and password when prompted, and the information is transferred to the remote server for confirmation and authorization. At a step 618, if the driver login is successful, the inspection report is transferred to the remote server at a step 624. However, in the event the login is not successful, at a step 620 a login error is displayed on the portable display device 114, and at a step 622 the option to retry the login is given to the driver. Following the transmission of the inspection report, at a step 626, it is determined whether the report was sent successfully to the remote server. If the report was successfully sent, at steps 632, 634 a prompt is displayed indicating successful transfer of the inspection report, and the report is also saved in the memory of the portable data device 114. However, in the event the transmission of the report was not successful, the process can be retried at steps 628, 630. Alternatively, at the step 630, instead of retransmitting the inspection report to the remote server, the inspection report can be saved in the memory of the portable data device 114 at the step 634 for transmission at a later time. At a step 636 an exit prompt is displayed on the portable data device 114.

With reference back to FIG. 7a, if at the step 612, a failure of an inspection point is recorded, an inspection failure process 615 can be performed. FIG. 7c is a flow diagram of an inspection failure process according to an embodiment of the present invention. At a step 617, the failing inspection points in the checklist are displayed. The driver is prompted to determine whether a mechanic should inspect the failure at a step 619. If the driver determines that the a mechanic does not need to inspect the failure at the time of inspection, the process of transferring the inspection report to the remote server is performed, as previously described with respect to FIG. 7b. However, if a mechanic is required, a mechanic is called to the vehicle to inspect the failing inspection point. Following the mechanic's review, at a step 621 the mechanic is presented with options, such as (1) the defects do not need to be corrected for safe operation or (2) defects have been corrected. It will be appreciated that other options can be presented to the mechanic without departing from the scope of the present invention. At a step 623, the mechanic selects one of the options, and in order to authenticate and confirm the response, at a step 625 the mechanic logs into the remote server under the mechanic's username and password. If the mechanic's login is successful at a step 627, the process completes and returns and continues with the process of having the inspection report transferred. However, if the login is unsuccessful, an error is displayed and the login can be retried at steps 629, 631.

Figure 8A:
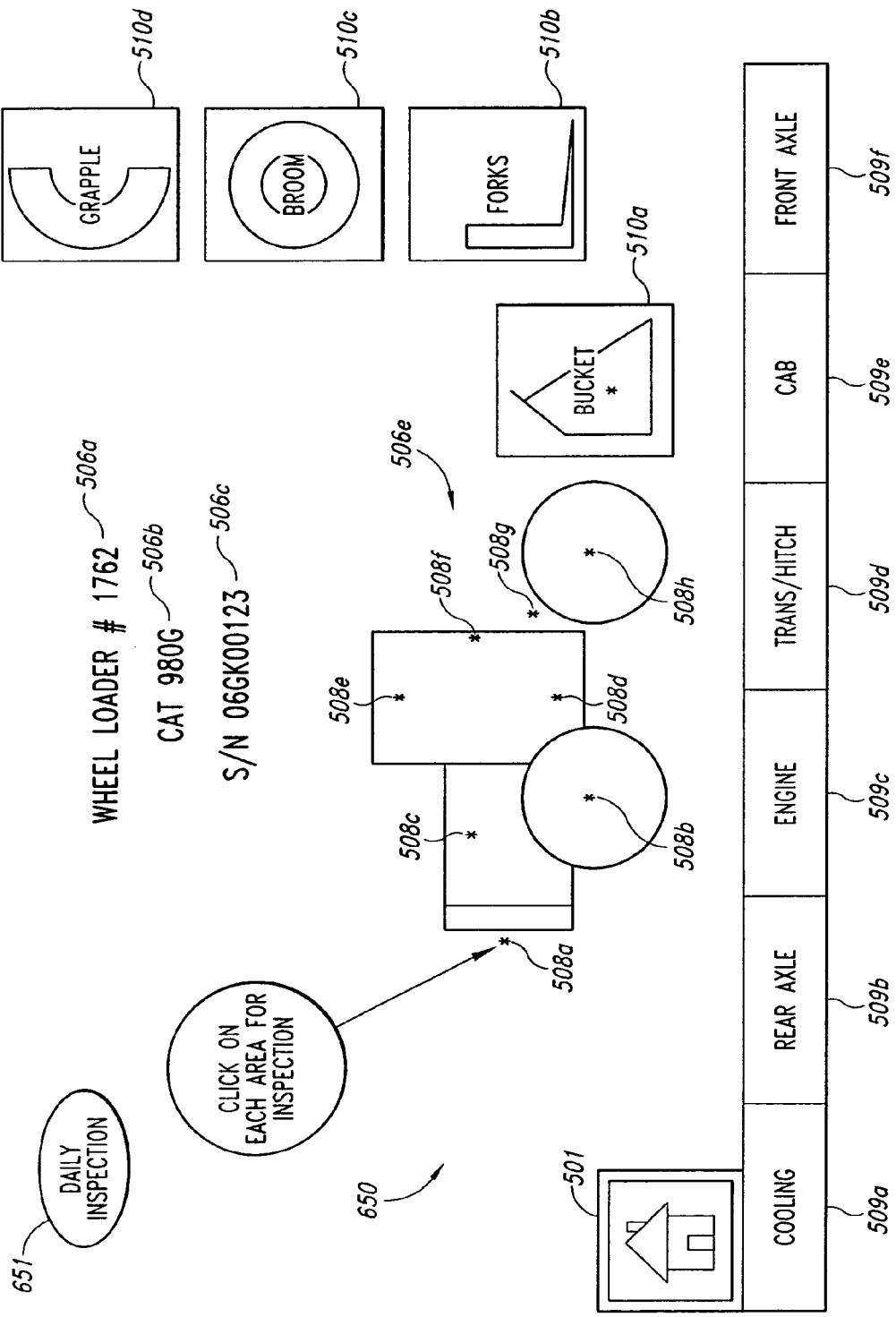
FIGS. 8a–8c are representative graphical interfaces displayed on a portable data device of an equipment tracking system according to an embodiment of the present invention for a Daily Inspection option.

In another embodiment of the present invention, a graphical interface is utilized for the Daily Inspection option. Illustrated in FIG. 8a is an example of a graphical interface 650 where the user has selected the Daily Inspection option 507a. An icon 651 is displayed in FIG. 8a to remind the user that the Daily inspection option 507a is currently active. As previously discussed, a daily inspection is typically performed prior to use of the equipment, and usually requires the inspection of various locations around the equipment. Although experienced mechanics are knowledgeable regarding the inspection points for various equipment types, providing a graphical representation of the equipment 506e with various inspection points 508a–508h indicated facilitates the inspection process and can prevent inadvertent oversight of an inspection point. As shown in FIG. 8a, various inspection points are indicated by asterisks 508 on a graphical representation 506e of the equipment being inspected. Also displayed in the graphical interface of FIG. 8a are graphical representations of different attachments 510a–d that can be selected by the user prior to beginning the inspection. In the present example, the attachments illustrated are common to a wheel loader, and include a bucket attachment 510a, fork attachment 510b, broom attachment 510c, and a grapple attachment 510d. However, it will be appreciated that the type of attachments illustrated in the graphical interface of FIG. 8a will depend on the equipment type, and can be different than those shown in FIG. 8a.

Component tabs 509a–509f are also displayed in the graphical interface of FIG. 8a. The tabs can be selected by the user to choose an inspection point at which to begin the inspection. The number and type of tabs 509a–509f will depend on the equipment type being inspected, and loosely correspond to the inspection points 508a–508h indicated on the graphical representation of the equipment 506e. The ordering of the tabs is made such that a mechanic will logically progress through the inspection process in an efficient manner around the equipment. In one embodiment of the present invention, the user selects a starting point for the inspection, and is led sequentially through the various inspection points in the order in which the tabs are displayed on the portable data device 114 by the . Thus, the user is forced to progress through the inspection process in a predefined order, which typically will be ordered in what is believed to be an efficient manner. In another embodiment, selection of an inspection starting point can be made by way of either the component tabs 509a–509f, or by touching on one of the inspection points 508a–508h on the graphical representation of the equipment 506e.

Figure 8B:
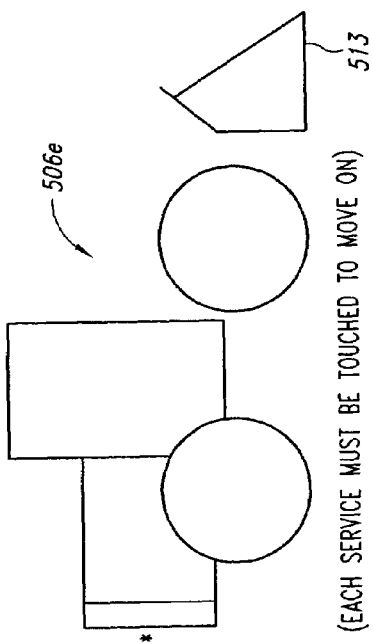
Figure 8B:
Figure 8B:
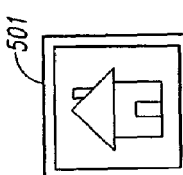
Figure 8C:
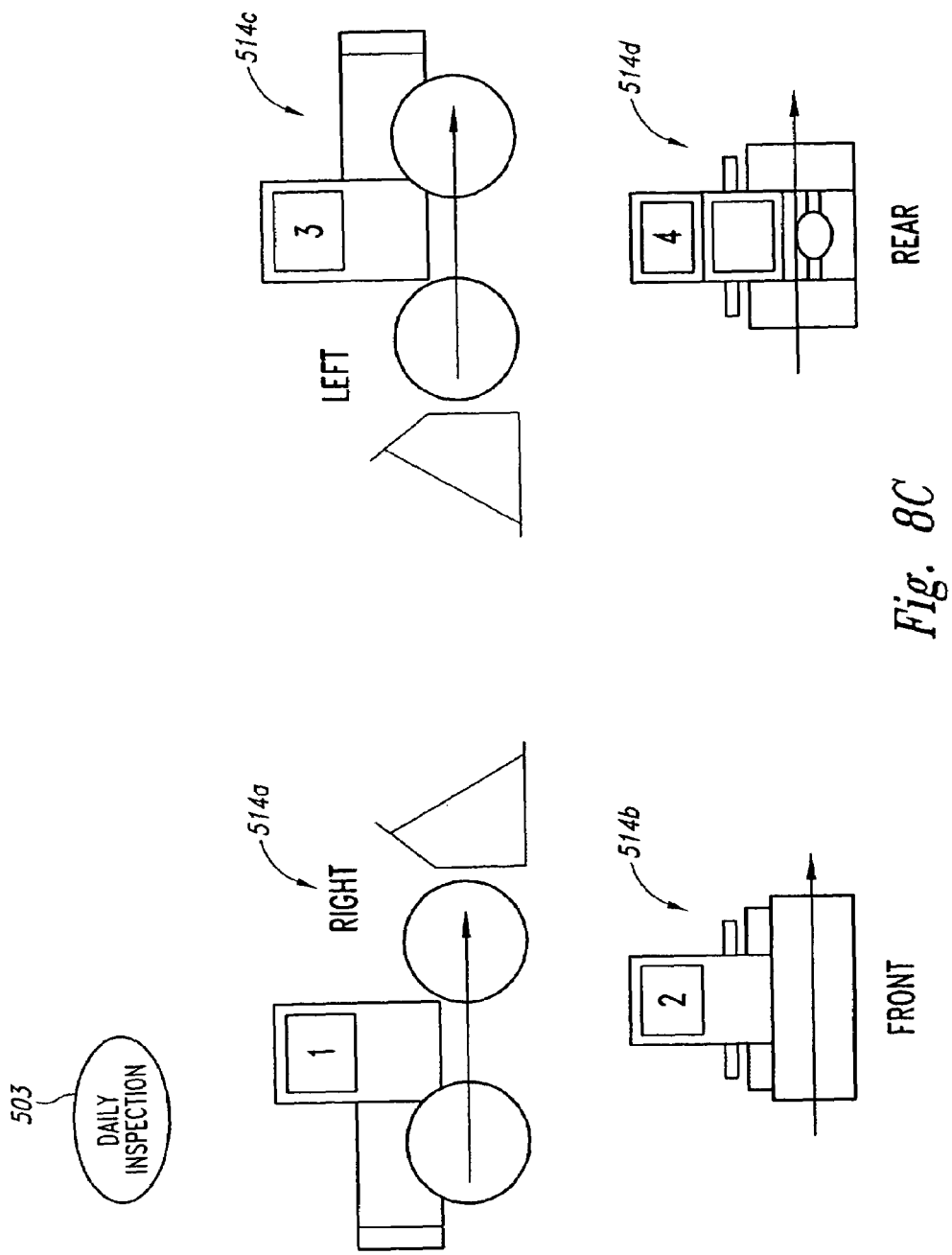

After an attachment and inspection starting point is selected by the user, a graphical interface such as that illustrated in FIG. 8b is displayed on the portable data device 114. In the present example, the bucket attachment 510a and the cooling system component tab 509a were selected as the attachment and starting point, respectively. As a result, a graphical representation of the equipment 506e having a bucket attachment 513 is illustrated along with a checklist of inspection items 512 and screen title 511 particular to the daily inspection of the cooling system. In one embodiment of the present invention, the user must check each of the items in the checklist 512 before a new checklist or graphical representation of the next inspection point is displayed on the portable data device 114, thus increasing the likelihood that a complete and comprehensive inspection will be performed by the user. When the checklist 512 particular for the present inspection point is completed, a checklist for the next inspection point is then provided for the user to complete. As the inspection process progresses, the graphical representation of the equipment displayed by the portable data device 114 will change accordingly. As shown in FIG. 8c, because the starting point for the inspection was the cooling system, the graphical representation 514a of the wheel loader is initially displayed. As the inspection progresses, the graphical representation of the wheel loader will change as illustrated in FIG. 8c. That is, the graphical representation 514a is followed by the graphical representation 514b, subsequently followed by the graphical representations of 514c and 514d as the inspection process progresses. As a result, the chance that an inspection item or an inspection point will be missed during the inspection process is reduced.

The Daily Lubrication option selected from the graphical interface of FIG. 6c will now be discussed. The information shown following the selection of the Daily Lubrication option is similar to that following the selection of the Daily Inspection option, as shown in FIG. 9a. For example, equipment information such as equipment type and machine number 506a, the equipment model number 506b, the equipment serial number 506c, and a graphical representation of the equipment 506e. Attachment options 510a–510d are provided for selection by the user. As shown in FIG. 9a, the bucket attachment has been selected. Lubrication point tabs 515a–515f for selection of various lubrication points are provided in the display of the portable data device 114 as well. Lubrication points 516a–516h are also shown as asterisks on the graphical representation of the wheel loader 506e. In one embodiment, a starting point for the daily lubrication process is selected using the lubrication point tabs 515a–515f. In another embodiment, selection of the starting point for the daily lubrication is made by way of either the lubrication point tabs 515a–515f or touching one of the lubrication points 516a–516h. The user is then stepped through each of the lubrication points in a sequence until the lubrication process is completed.

Figure 9B:
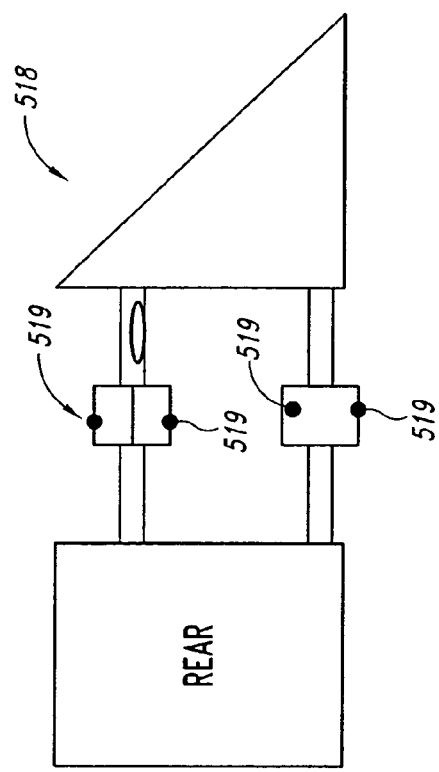
Figure 9B:
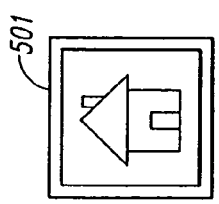

In the present example, the hitch assembly 516c has been selected by the user. The graphical interface shown in FIG. 9b is then displayed on the portable data device 114. By pointing to the selected assembly on the graphical representation 516c, an enlarged image will be displayed showing in greater detail the lubrication points for the hitch assembly. Such an enlarged image is illustrated in FIG. 9b. A graphical representation of the hitch assembly 518 is displayed with the lubrication points 519. Thus, a user will be reminded of the correct number and location of lubrication points in performing the daily lubrication procedure.

As with the Daily Inspection process, the graphical representation of the equipment changes as the lubrication procedure progresses. That is, different views of the wheel loader are illustrated depending on the lubrication point currently being lubricated. The view of the wheel loader changes as needed when moving to another lubrication point. In each of the images of the wheel loader, the various assemblies that should be lubricated will be indicated, and where it will be helpful, an enlarged image showing the specific lubrication points of an assembly can be displayed by user selection as previously described.

In one embodiment of the invention, a lubrication summary is made available to the user through the portable data device 114. For example, the type of information that can be provided to and recorded by the user in the lubrication summary, and the interrelationship of that information. That is, for each of the components that may be selected for daily lubrication, information related to the brand of lubricant, grade of lubricant, and the quantity of lubricant is made available. Additionally, the brand, grade and quantity of lubricant used in the current lubrication procedure can be recorded by the user for future reference.

Figure 9C:
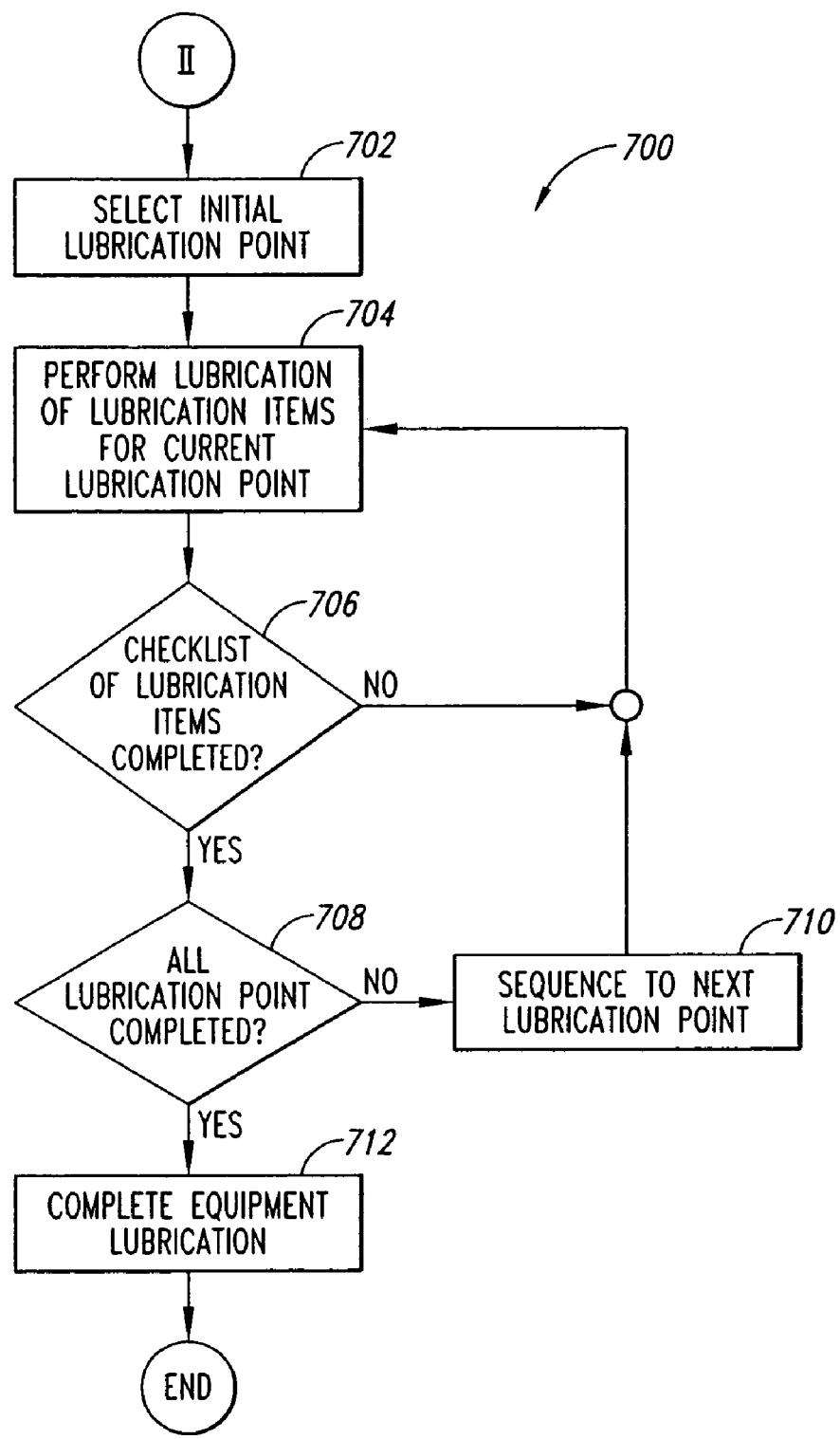
FIG. 9c is a flow diagram of the Daily Lubrication option according to an embodiment of the present invention.

FIG. 9c illustrates a flow diagram of the Daily Lubrication option according to an alternative embodiment of the present invention. Although the Daily Lubrication option was previously discussed as being implemented using a graphical interface, it can also be implemented using a textual interface. For example, the various lubrication points can be provided to the user in the form of a list, and sub-lists can be provided when one of the items on the lubrication point list is selected. The sub-list can provide the specific points for the selected assembly that need to be lubricated. As each point of the sub-list is lubricated, the user can check off the item. Upon completing the lubrication of points in the sub-list, the next lubrication point can be selected, and the process of lubricating the specific points of the selected assembly, and then selecting another lubrication point is repeated until lubrication of the machine is completed. The previously described lubrication process is illustrated by flow diagram 700 of FIG. 9c as steps 702–712.

The Scheduled Service option selected from the graphical interface of FIG. 6c will now be discussed. As shown in FIG. 10a, the information displayed to the user on the portable data device 114 for the Scheduled Service option is similar to that of the graphical interface for the Daily Inspection option illustrated in FIG. 8a. In addition to the elements that were described with respect to FIG. 8a, information 520 regarding when the last scheduled service was performed and the next recommended scheduled service is displayed on the portable data device 114. Selection of the service point can be made through the use of the component tabs 509*a*–509*f*. Additionally, it may be possible to select the desired service point by touching the area as indicated by an asterisk on the graphic representation 506*e* of the wheel loader. In one embodiment of the present invention, the selection of a service point selects a starting point for the scheduled service for the entire equipment, and the user is led through each service point in a sequence until the scheduled service for the equipment is completed.

Upon selecting a service point, information regarding the next recommended scheduled service for the service point is provided to the user. A graphical interface providing such information is shown in FIG. 10*b*. Displayed therein is a checklist of service items 524 so that the user can check off the items as they are serviced. Further displayed is information 527 reporting the particular service point, the type of equipment, and for which scheduled service the checklist represents. A repair option 526 can be selected by the user to access information regarding the repair of the selected service, for example, a repair record thereof. A service point graphic representation option 528 can be selected by the user to provide a graphic image of the selected service point with service items highlighted by arrows. Additional information such as manufacturer's service recommendations may also be provided when this option is selected by the user. In one embodiment, another option that is available to the user is the order parts option 530 which enables the user to use the portable data device 114 to request parts related to the selected service point.

Figure 10C:
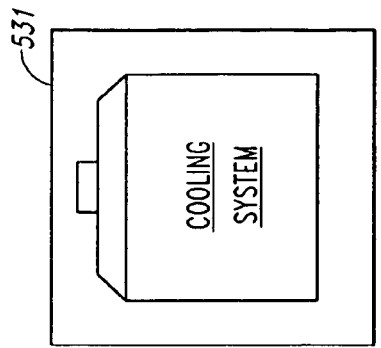
Figure 10C:
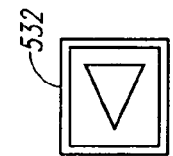
Figure 10C:
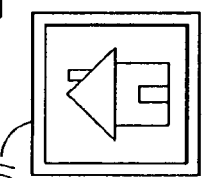

In the event that the user has selected the repair option 526, a graphical interface such as that shown in FIG. 10*c* is displayed on the portable data device 114. A checklist 530 having various items related to the selected service point can be used by the user to identify the service item for which the repair information is requested. An icon 531 of the cooling system and information 533 is displayed to identify that the checklist is related to the repair of the cooling system. A return option 532 can be used by the user to return to a previous screen, such as the graphical interface shown in FIG. 10*b*. FIG. 10*d* illustrates a graphical interface displayed on the portable data device 114 following the selection of the service point graphic representation option 528 from the screen illustrated in FIG. 10*b*. A graphic representation of the selected service point 534 is displayed along with arrows highlighting the particular service items. As shown in FIG. 10*d*, the graphic representation of the selected service point 534 is of a cooling system for the wheel loader. Arrows highlight various service points, including a radiator 536 and cap 537, hoses 538, and fan shroud 539 and fan blades 540. A return option 532 can be used by the user to return to a previous screen, such as that shown in FIG. 10*b*.

In an embodiment of the present invention, a user is led through the different service points of the equipment in sequence after selecting a service point at which to begin the scheduled service. For example, after completing the scheduled service for the cooling system, the user is then provided with information regarding the scheduled service for another service point on the equipment. Upon completion the servicing of that service point, the next service point in the sequence is displayed. The process is repeated until the scheduled service is completed. Additionally, as the scheduled service progresses, generally following the manufacturer's or regulator agency's suggested guidelines, the graphic representation of the equipment being serviced can change accordingly to provide the user with the appropriate view of the equipment being serviced. This feature has been previously described with respect to the Daily Inspection process and the Daily Lubrication process, and can be similarly applied for the Scheduled Service process as well.

Figure 10E:
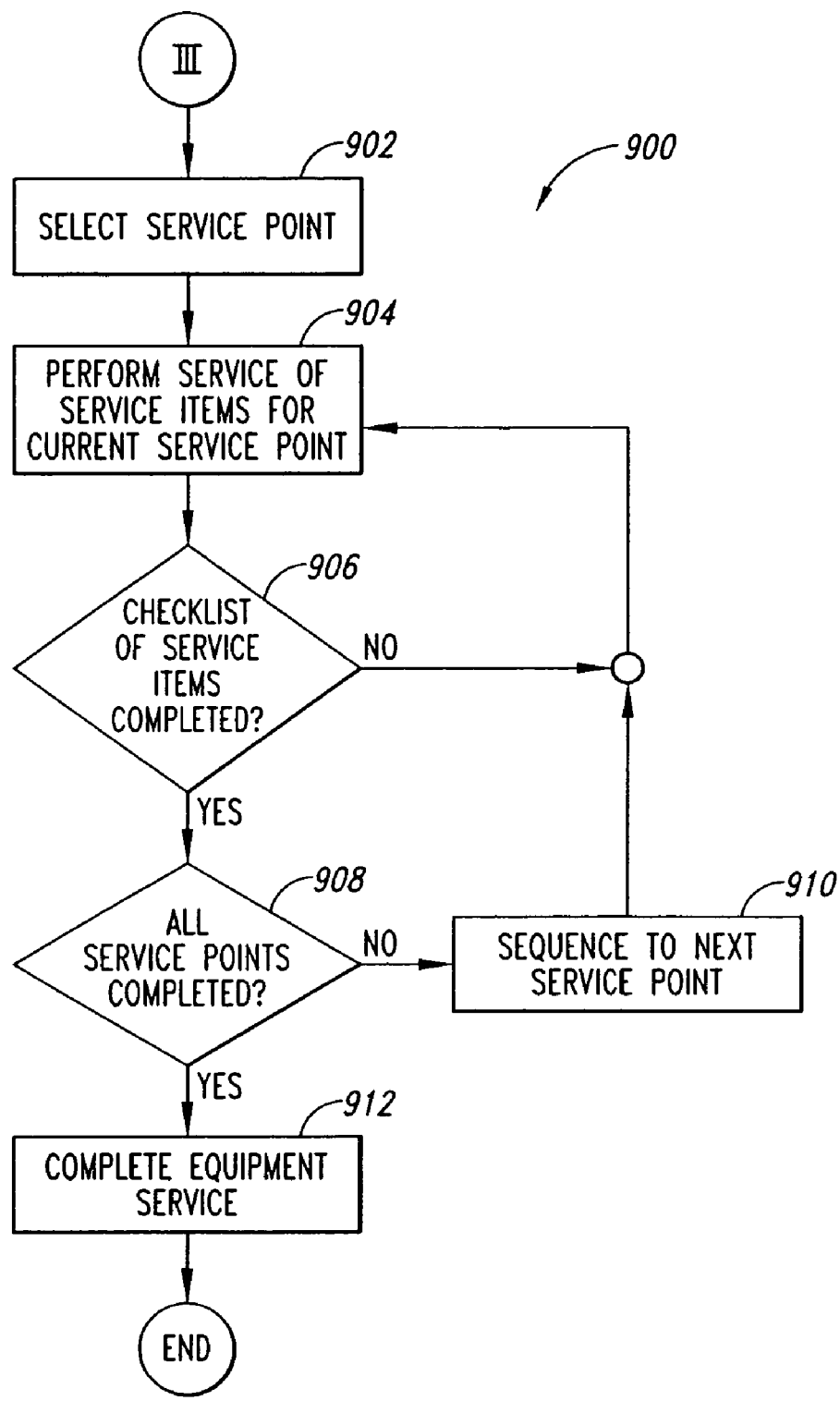
FIG. 10e is a flow diagram of the Scheduled Service option according to an embodiment of the present invention.

FIG. 10*e* illustrates a flow diagram 900 of the Scheduled Service option according to an alternative embodiment of the present invention. Steps 902–912 of the flow diagram 900 can be implemented using a text user interface, instead of the graphical interface previously discussed. As described with respect to the Daily Inspection option and the Daily Lubrication option, a textual list of service points can be provided to the user on the portable data device 114. Sub-lists of service items for a particular service point can be provided for a selected service point, which can be checked off by the user as each of the service items is completed. The process of selecting a service point and performing service on each of the service items for the selected service point can be repeated until the scheduled service is completed for the equipment.

It will be appreciated by those ordinarily skilled in the art that the previously described graphical and textual interfaces of the Daily Inspection option, the Daily Lubrication option, and the Scheduled Service option can be applied to other options selected from the graphical interface of FIG. 6*c*. For example, the graphical and textual interfaces can be applied to the Repair option. In summary, following the selection of the repair option 507*d*, information regarding the repair of various repair points on the equipment can be displayed for the user through the portable data device 114. A repair point can be selected by touching an area on a graphical representation of the equipment or component tabs to have information regarding the repair of the selected component provided to the user via the portable data device 114. A more detailed view of the selected assembly can also be provided to the user upon selection. In an alternative embodiment of the present invention, an order parts option can be made available to the user so that the replacement parts can be ordered using the portable data device 114. A Service Suggestion option and Notes option can also be displayed in a graphical interface for the Repair option. Selecting the Service Suggestion option provides the user with information on servicing and repairing the particular assembly, while selecting the Notes option provides the user with additional information regarding the service and repair of the particular assembly, for example, recommendations from the manufacturer, or product updates that are relevant to the repair or service of the assembly.

It will be appreciated that some or all of the principles of the present invention may be implemented through software, and that those of ordinary skill in the art have sufficient knowledge of the art to practice the present invention based on the description provided herein. An equipment tracking system according to the present invention include embodiments that provide to a user a system and method that facilitates tracking and recording equipment information related to the inspection, service, maintenance, and repair of a fleet of equipment. As previously mentioned, the particular examples provided herein were intended to assist in the understanding of the present invention, and should not be used to limit its scope. It will be further appreciated that various modifications may be made without deviating from the spirit and scope of the invention.

The invention claimed is:

1. A system for maintaining inspection reports of a group of equipment, comprising:
   a data communication network over which data can be transferred;
   a memory coupled to the network for storing data representing inspection reports of equipment;

a server coupled to the network for accessing the data stored by the memory; and a wireless portable communication device to communicate with the server over the network and access the data stored by the memory, the wireless portable communication device having a processor, a display, and a local memory storing data representing an inspection checklist, data representing completed inspection checklists, and an inspection application and a regulatory interface application, the inspection application executed by the processor to retrieve the data representing the inspection checklist and display the checklist on the display, and in response to completion of the checklist, store the data for the completed inspection checklist in the local memory and transmit the data for the completed inspection checklist to the server for storage in the memory as data representing an inspection report, the regulatory interface application executed by the processor to communicate with a regulatory application having access to the data stored by the memory and providing a regulatory agency with the data for inspection and review thereof.

2. The system of claim 1 wherein the wireless portable communication device comprises a cellular telephone.

3. The system of claim 1 wherein the wireless portable communication device comprises a personal digital assistant (PDA).

4. The system of claim 1 wherein the data representing an inspection checklist comprises data representing a list of inspection items for a requested equipment.

5. The system of claim 4 wherein the inspection checklist comprises a list of user defined inspection points on the requested equipment.

6. The system of claim 1 wherein the memory further stores data representing service reports for equipment and wherein the local memory comprises a local memory having data representing a service application and a service checklist stored thereon, the service application executed by the processor to retrieve the data representing the service checklist and display the service checklist on the display, and in response to completion of the service checklist, store the data for the completed service checklist in the local memory and transmit the data representing the completed inspection checklist to the server for storage in the memory as data representing a service report.

7. The system of claim 1 wherein the memory further stores data representing repair information for equipment and wherein the local memory comprises a local memory having data representing a repair application stored thereon, the repair application executed by the processor to access the server, retrieve data representing repair information from the memory, and display the repair information on the display.

8. The system of claim 1 wherein the regulatory interface application comprises a regulatory interface application for communicating with an application having access to the data stored by the memory and providing a governmental agency with the data for inspection and review thereof.

9. The system of claim 1 wherein the memory comprises a memory coupled to the network for storing data representing inspection reports of equipment for a plurality of different equipment owners.

10. The system of claim 1, further comprising an accounting interface application executed for communicating with an accounting application having access to the data stored by the memory.

11. The system of claim 10 wherein the accounting application having access to the data stored by the memory is utilized for analysis and documentation of the data.

12. A system for tracking equipment, comprising:

a portable data device for entering and receiving data remotely, the portable data device having a memory, a processor, and a display;

a server system in communication with the device through a network;

a database coupled to the server system in which data related to inspection of the equipment are stored;

an inspection component stored in the memory and executed by the processor of the portable data device to retrieve from the memory data representing an inspection checklist and display the inspection checklist on the display, the inspection component further providing a request to the server system to provide data representing inspection information for a requested equipment to the portable data device in response to an inspection information request; and at least one of a regulatory interface component and an accounting interface component, the regulatory interface component for communicating with a regulatory application having access to the data stored by the server system and providing a regulatory agency with the data for inspection and review thereof and the accounting interface component for communicating with an accounting application having access to the data stored by the database.

13. The system of claim 12, further comprising a service component stored in the memory and executed by the processor of the portable data device to retrieve from the memory data representing a service checklist and display the service checklist on the display, the service component further providing a request to the server system to provide data representing service information for the requested equipment to the portable data device in response to a service information request.

14. The system of claim 13 wherein the service information for various service points comprises service checklists for the various service points.

15. The system of claim 14 wherein the service component, in response to completion of the service checklists, updates a service log stored by the server system with a record of the completed service checklists.

16. The system of claim 13 wherein the display of the portable data device comprises a touch-screen display through which data is entered, and the service component provides in addition to the service information a graphical image of the requested equipment on which a starting service point is selected by touching the touch-screen in proximity to an available service point on the graphical image.

17. The system of claim 12, further comprising a repair component stored in the memory and executed by the processor of the portable data device to send a request to the server system to provide data representing repair information for the requested equipment to the portable data device in response to a repair information request.

18. The system of claim 17 wherein the repair component, in response to receiving indication of a completed repair, updates a repair log stored by the server system with a record of the completed repair.

19. The system of claim 12 wherein the display of the portable data device comprises a touch-screen display through which data is entered, and the repair component provides in addition to the repair information a graphical image of the requested equipment and more detailed repair information for a repair point in response to touching the touch-screen in proximity to the repair point on the graphical image.

20. The system of claim 12 wherein the device includes a touch-screen display on which data is entered, and the inspection component provides a graphical image related to the inspection information, the inspection component providing additional inspection information related to a region of the graphical image in response to touching the display corresponding to the region of the graphical image.

21. The system of claim 12 wherein, in response to completion of the inspection checklist, the inspection component further updates an inspection log stored by the server system with a record of the completed inspection checklist.

22. The system of claim 12 wherein the display of the portable data device comprises a touch-screen display through which data is entered, and the inspection component provides in addition to the inspection checklist a graphical image of the requested equipment on which a starting inspection point is selected by touching the touch-screen in proximity to an available inspection point on the graphical image.

23. The system of claim 12, further comprising:
a manufacturer interface component for communicating with a manufacturer application having access to data stored by the database and providing a manufacturer of the equipment with the data for review.

24. The system of claim 12 wherein the regulatory interface component comprises a regulatory interface component for communicating with an application having access to the data stored by the server system and providing a governmental agency with the data for inspection and review thereof and wherein the accounting interface component comprises an accounting interface component for communicating with an accounting application of a third party having access to the data stored by the database.

25. The system of claim 12 wherein the database comprises a database coupled to the server system in which the data related to inspection of the equipment for a plurality of different equipment owners are stored.

26. The system of claim 12 wherein the accounting application communicating with the accounting interface component is operable for analysis and documentation of the data stored by the server system by a third party.

27. A method for tracking inspection information for a group of equipment, comprising:
storing equipment inspection information for the group of equipment;
displaying an inspection checklist for a selected one of the group of equipment on a portable data device;
storing data representing a completed inspection checklist;
transmitting the data representing the completed inspection checklist to a server system for storage as equipment inspection information;
requesting a server system to retrieve from the equipment information an inspection checklist for a selected one of the group of equipment in response to selecting an inspection option;
requesting a server system to retrieve from the equipment information service information for various service points of the selected equipment in response to selecting a service option;
requesting a server system to retrieve from the equipment information repair information for the selected equipment in response to selecting a repair option; and
providing at least one of a regulatory application and an accounting application access to the stored equipment information, the regulatory application allowing a regulatory agency inspection and review of the stored equipment information and the accounting application provided by a third-party accounting software vendor.

28. The method of claim 27, further comprising requesting the server system to retrieve from the equipment information data for a completed inspection checklist for a selected one of the group of equipment to be displayed on the portable data device.

29. The method of claim 27 wherein requesting a server system to retrieve an inspection checklist comprises:
requesting a checklist of inspection items for a starting inspection point;
in response to completion of the checklist of inspection items for the starting inspection point, requesting a checklist of inspection items for a next inspection point; the next inspection point provided in accordance with a sequence based on the location of the starting inspection point; and
providing a checklist of inspection items for the next inspection point in the sequence until inspection of the selected equipment is completed.

30. The method of claim 27, further comprising providing a manufacturer application access to the stored equipment information to allow a manufacturer of the equipment review thereof.

31. The method of claim 27 wherein the regulatory application comprises a regulatory application allowing a governmental agency inspection and review of the equipment information and wherein the accounting application comprises an accounting application of a third party.

32. The method of claim 27 wherein storing equipment inspection information for the group of equipment comprises storing equipment inspection information for the group of equipment for a plurality of different equipment owners.

33. The method of claim 27 wherein the accounting application having access to the stored equipment information is utilized by a third party for analyzing and documenting the equipment information.

* * * * *